(12) United States Patent
Hirai

(10) Patent No.: US 8,436,933 B2
(45) Date of Patent: May 7, 2013

(54) IMAGE PICKUP SYSTEM AND LENS APPARATUS

(75) Inventor: Keisuke Hirai, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 267 days.

(21) Appl. No.: 12/850,354

(22) Filed: Aug. 4, 2010

(65) Prior Publication Data

US 2011/0032411 A1    Feb. 10, 2011

(30) Foreign Application Priority Data

Aug. 10, 2009   (JP) .................................. 2009-185460

(51) Int. Cl.
*H04N 5/228*   (2006.01)

(52) U.S. Cl.
USPC ..................... 348/345; 348/208.12; 396/72

(58) Field of Classification Search .................. 348/345, 348/208.12, 348, 349, 353, 354; 396/72–84
See application file for complete search history.

(56) References Cited

U.S. PATENT DOCUMENTS 5,243,375 A *  9/1993  Ishida et al. .................. 396/123
6,822,686 B1  11/2004  Kubo et al.

FOREIGN PATENT DOCUMENTS

| JP | 2000-009430 A | | 1/2000 |
| JP | 2002-281371 A | | 9/2002 |
| JP | 2002281371 A | * | 9/2002 |
| JP | 2007-058112 A | | 3/2007 |
| JP | 2008-052022 A | | 3/2008 |
| JP | 4072220 B2 | | 4/2008 |

* cited by examiner

*Primary Examiner* — Roberto Velez
*Assistant Examiner* — Yih-Sien Kao
(74) *Attorney, Agent, or Firm* — Rossi, Kimms & McDowell LLP

(57) ABSTRACT

The image pickup system is constituted by a lens apparatus including a focus lens and an image pickup apparatus performing image pickup through the lens apparatus. The system includes an operating part being operated to instruct a movement of the focus lens, a controller performing focus position control to move the focus lens to a position corresponding to an operation amount of the operating part, a ranging part detecting an object distance in each of plural ranging areas included in an image pickup region, and a determining part determining a distance range where the object distances detected in the plural ranging areas are distributed. The system further includes a changing part changing a relationship between the operation amount of the operating part and the position of the focus lens in the focus position control according to a determination result by the determining part.

6 Claims, 17 Drawing Sheets

IMAGE PICKUP SYSTEM AND LENS APPARATUS

BACKGROUND OF THE INVENTION

1. Field of the Invention

The present invention relates to an image pickup system including a ranging (distance measuring) function, and a lens apparatus.

2. Description of the Related Art

Some image pickup systems and lens apparatuses perform focusing on an object by moving a focus lens in response to a manual operation of a focus operating member (that is, by manual focusing). Such image pickup systems and lens apparatuses include ones in which a movement amount of the focus lens with respect to a change amount of an operation amount of the focus operating member (hereinafter referred to as "focus operation sensitivity") can be changed.

For example, Japanese Patent No. 4072220 has disclosed a focus operating apparatus that can change the focus operation sensitivity by changing a conversion characteristic of a rotation angle of a rotationally operable focus operating member into a focus lens position control signal.

Moreover, Japanese Patent Laid-Open No. 2002-281371 has disclosed a focus controlling apparatus that changes the focus operation sensitivity according to types (magnifications) or focal lengths of lens apparatuses.

However, the focus controlling apparatus disclosed in Japanese Patent Laid-Open No. 2002-281371 requires a user to change setting of the focus operation sensitivity through a manual operation in order to change the focus operation sensitivity in a case where the types (magnifications) or focal lengths of the lens apparatuses are mutually the same. This may require a user who sets the focus operation sensitivity to perform a cumbersome operation and may deteriorate focus operability due to delay, forgetting and mistake of the setting.

SUMMARY OF THE INVENTION

The present invention provides an image pickup system and a lens apparatus which are capable of automatically setting appropriate focus operation sensitivity.

The present invention provides as an aspect thereof an image pickup system constituted by a lens apparatus including a focus lens and an image pickup apparatus performing image pickup through the lens apparatus. The system includes an operating part configured to be operated to instruct a movement of the focus lens, a controller configured to perform focus position control to move the focus lens to a position corresponding to an operation amount of the operating part, a ranging part configured to detect an object distance in each of plural ranging areas included in an image pickup region, a determining part configured to determine a distance range where the object distances detected in the plural ranging areas are distributed, and a changing part configured to change a relationship between the operation amount of the operating part and the position of the focus lens in the focus position control according to a determination result by the determining part.

The present invention provides as another aspect thereof a lens apparatus being used for an image pickup system including an image pickup apparatus performing image pickup through the lens apparatus. The lens apparatus includes a focus lens, and a ranging part configured to detect an object distance in each of plural ranging areas included in an image pickup region. The image pickup system includes an operating part configured to be operated to instruct a movement of the focus lens, a controller configured to perform focus position control to move the focus lens to a position corresponding to an operation amount of the operating part, a determining part configured to determine a distance range where the object distances detected in the plural ranging areas are distributed, and a changing part configured to change a relationship between the operation amount of the operating part and the position of the focus lens in the focus position control according to a determination result by the determining part.

Other aspects of the present invention will become apparent from the following description and the attached drawings.

DESCRIPTION OF THE PREFERRED EMBODIMENTS

Exemplary embodiments of the present invention will be described hereinafter with reference to the accompanying drawings.

Embodiment 1

Figure 1A:
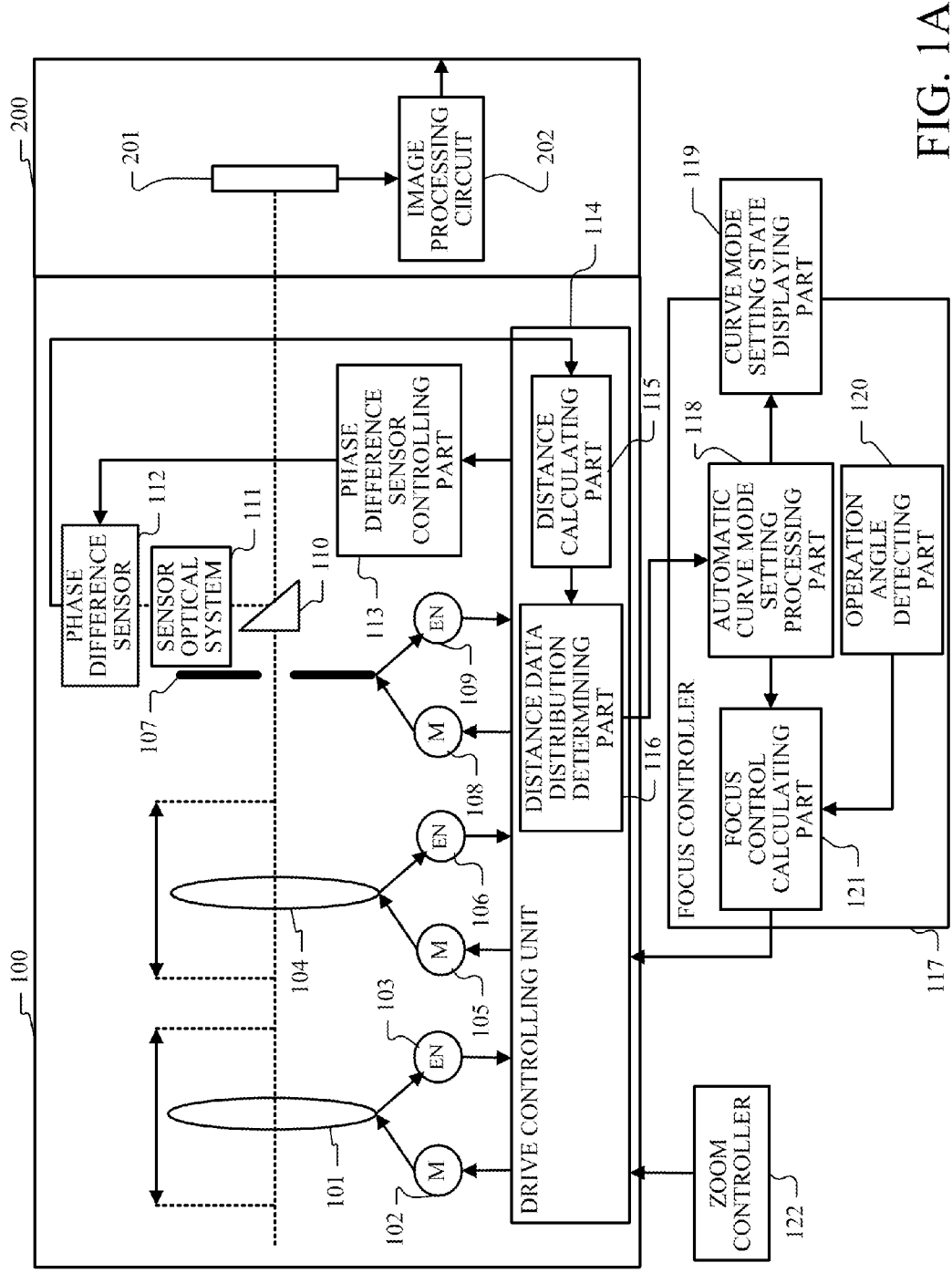
FIG. 1A shows a configuration of an image pickup system that is Embodiment 1 of the present invention.

FIG. 1A shows a configuration of an image pickup system that is a first embodiment (Embodiment 1) of the present invention. In this figure, reference numeral 100 denotes a lens apparatus, and reference numeral 200 denotes a camera as the image pickup apparatus to which the lens apparatus 100 is detachably attached and which performs image pickup through the lens apparatus 100. Reference numeral 117 denotes a focus controller (also referred to as a focus demand), and reference numeral 122 denotes a zoom controller (also referred to as a zoom demand).

In the lens apparatus 100, reference numeral 101 denotes a focus lens, and a reference numeral 102 denotes a focus motor as an actuator that moves the focus lens 101 in an optical axis direction to perform focusing. The focus lens 101 is movable between a position corresponding to a close distance end and a position corresponding to an infinite distance end. Reference numeral 103 denotes a focus position detector constituted by an encoder, a potentiometer or the like, which detects a position of the focus lens 101.

Reference numeral 104 denotes a zoom lens, and reference numeral 105 denotes a zoom motor as an actuator that moves the zoom lens 104 in the optical axis direction to perform variation of magnification. The zoom lens 104 is movable between a position corresponding to a wide-angle end and a position corresponding to a telephoto end. Reference numeral 106 denotes a zoom position detector constituted by a potentiometer, an encoder or the like, which detects a position of the zoom lens 104.

Reference numeral 107 denotes an iris that adjusts an amount of light passing through an image taking optical system which will be described later, and reference numeral 108 denotes an iris motor as an actuator that drives the iris 107. Reference numeral 109 denotes an iris position detector constituted by a potentiometer, an encoder or the like, which detects a state (position in an opening and closing direction) of the iris 107. The focus lens 101, the zoom lens 104, the iris 107 and lenses which are not shown in the figure constitute the image taking optical system.

Reference numeral 110 denotes a light flux separating element that separates a light flux entering from the image taking optical system into a light flux passing therethrough and a light flux reflected thereby. Reference numeral 111 denotes a sensor optical system including a secondary image-forming lens that separates the light flux reflected by the light flux separating element 110 into plural paired light fluxes.

Reference numeral 112 denotes a phase difference sensor including plural pairs of line sensors (photoelectric conversion element arrays) which are not shown. A pair of object images (hereinafter referred to as "two images") is formed with the paired light fluxes emerging from the sensor optical system 111 on each pair of line sensors. Each pair of line sensors photoelectrically converts the two images to output paired image signals. The paired image signals are output to a drive controlling unit 114 which will be described later.

On each pair of line sensors provided in the phase difference sensor 112, two images of an object included in each of plural ranging areas (or distance measuring areas) included in an image pickup region (hereinafter referred to as an "image pickup frame") are formed.

Figure 1B:
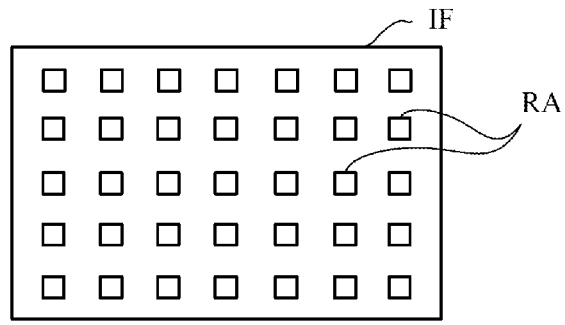
FIG. 1B shows an arrangement example of ranging areas in Embodiment 1.

FIG. 1B shows the plural ranging areas RA formed in the image pickup frame IF. FIG. 1B shows an example in which the plural ranging areas RA are vertically and horizontally arranged in a matrix form in the image pickup frame IF.

Reference numeral 113 denotes a phase difference sensor controlling part that controls drive of the phase difference sensor 112. Reference numeral 114 denotes the drive controlling unit that governs controls of the focus lens 101, the zoom lens 104, the iris 107 and the phase difference sensor 112, etc.

In the drive controlling unit 114, reference numeral 115 denotes a distance calculating part that performs correlation calculation on the paired image signals output from each pair of line sensors in the phase difference sensor 112 to calculate an interval (phase difference) between the two images formed on the paired line sensors. Then, the distance calculating part 115 calculates a distance to an object (hereinafter referred to as an "object distance") included in the ranging area corresponding to the paired line sensors on the basis of the phase difference and information on a base length between the paired line sensors. Thus, a ranging part constituted by the phase difference sensor 112 and the distance measuring part 115 can calculate the object distance in each of the plural ranging areas RA provided in the image pickup frame IF.

The "object distance" may be a distance from the lens apparatus 100 (for example, from a most object side lens surface of the image taking optical system) to the object or a distance from the camera 200 (for example, from an image pickup surface of an image pickup element 201 which will be described later) to the object.

Reference numeral 116 denotes a distance data distribution determining part serving as a determining part. The distance data distribution determining part 116 determines a distance range where the object distances calculated (detected) in the plural ranging areas by the distance calculating part 115 are distributed. The object distances calculated in the plural ranging areas are hereinafter also referred to as the "plural object distances". The determination result by the distance data distribution determining part 116 is sent to the focus controller 117.

The focus controller 117 serving as a focus operating part is provided with a focus operating member (hereinafter referred to as a "focus operating knob") which is not shown. The focus operating knob is rotationally operated by a user to instruct a movement of the focus lens 101. An operation angle detecting part 120 is constituted by an encoder, a potentiometer or the like, which detects an operation amount (hereinafter referred to as an "operation angle") of the focus operating knob.

Reference numeral 118 denotes an automatic curve mode setting processing part serving as a changing part which changes a curve mode that decides operation sensitivity of the focus lens 101 (hereinafter referred to as "focus operation sensitivity") according to the determination result sent from the distance data distribution determining part 116. The curve mode means a relationship of the position of the focus lens 101 to the operation angle of the focus operation knob (in other words, a relationship between the position of the focus lens 101 and the operation angle of the focus operation knob). The focus operation sensitivity means a change amount of the position of the focus lens 101 (that is, a movement amount of the focus lens 101) to a change amount of the operation angle of the focus operation knob.

In this embodiment and other embodiments which will be described later, the automatic curve mode setting processing part 118 decides a shape of a curve which represents the relationship of the movement amount of the focus lens 101 to the operation amount of the focus operation knob on the basis of the determination result (ranging result) of the distance data distribution determining part 116, a result of object recognition or the like. However, the shape of the curve may be decided on the basis of setting items added by the user (camera operator), or with taking the setting items added by the user into consideration, in addition to the ranging result or the object recognition result. For example, the shape of the curve may be decided with taking a distance range where the user desires to perform fine in-focus position adjustment and selects through a switch or the like such as a close distance range, a middle distance range and an infinite distance range into consideration, in addition to the determination result by the distance data distribution determining part 116.

Reference numeral 121 denotes a focus control calculating part that generates a focus control signal on the basis of the operation angle detected by an operation angle detecting part 120 and the curve mode set by the automatic curve mode setting processing part 118. The focus control calculating part 121 sends the generated focus control signal to the drive controlling unit 114 of the lens apparatus 100. The drive controlling unit 114 performs focus position control (that is, control of the focus motor 102) to move the focus lens 101 to a position instructed by the focus control signal (in other words, a position corresponding to the operation angle of the focus operating knob).

Reference numeral 119 denotes a curve mode setting state displaying part that displays information showing the curve mode set by the automatic curve mode setting processing part 118 on a display element such as an LED or a liquid crystal display device.

The zoom controller 122 serving as a zoom operating part is provided with a zoom operating member operated by the user, and outputs a zoom control signal corresponding to an operation amount of the zoom operating member. The zoom control signal is sent to the drive controlling unit 114 of the lens apparatus 100. The drive controlling unit 114 performs zoom speed control (that is, control of the zoom motor 105) to move the zoom lens 104 at a speed instructed by the zoom control signal (in other words, at a speed corresponding to the operation amount of the zoom operating member).

In the camera 200, reference numeral 201 denotes an image pickup element constituted by a CCD sensor, a CMOS sensor or the like, which photoelectrically converts the object image (s) formed in the image pickup frame by the image taking optical system of the lens apparatus 100. Reference numeral 202 denotes an image processing circuit that performs various image processing on output signals from the image pickup element 201 to generate images (video). The generated images are output to an outside of the camera 200 to be displayed on a monitor, recorded in a recording medium such as a videotape, an optical disk or a semiconductor memory, and broadcasted on TV.

Figure 2:
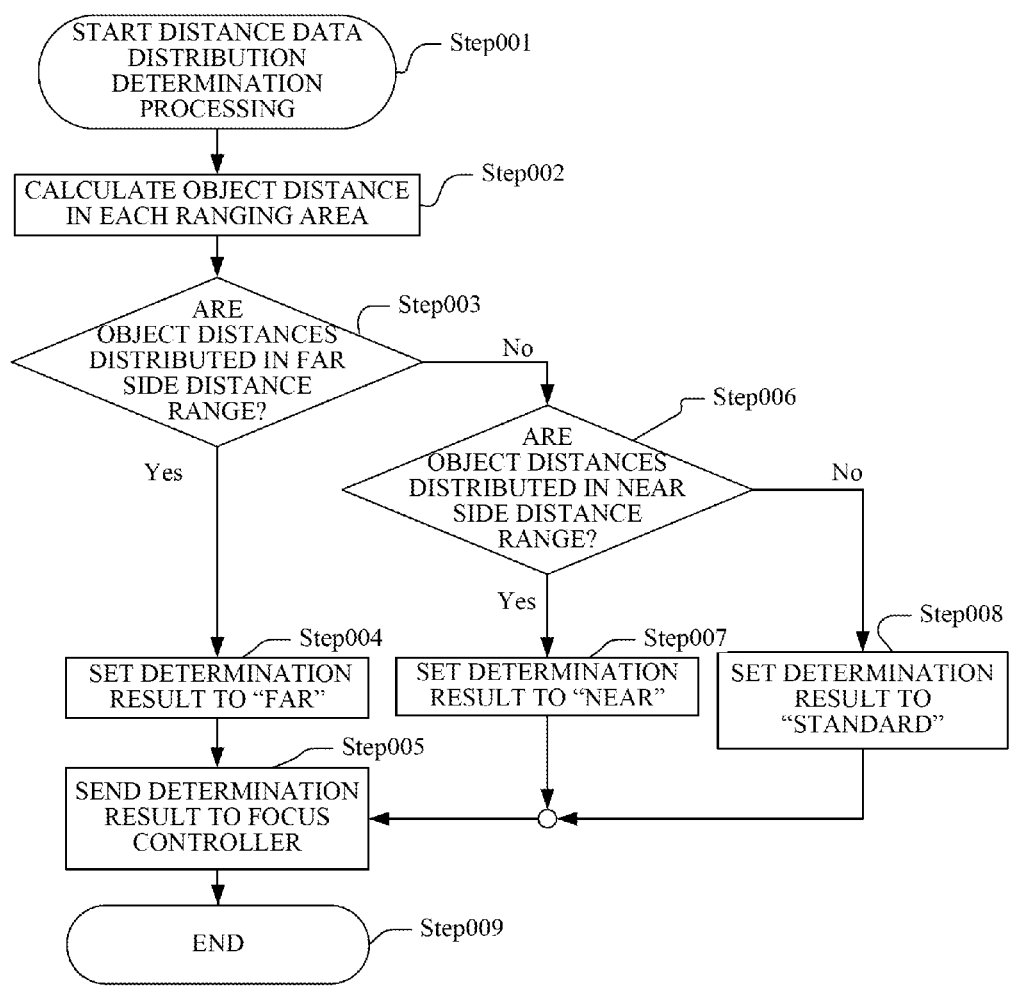
FIG. 2 is a flowchart showing processing performed in a drive controlling unit in Embodiment 1.

A flowchart of FIG. 2 shows distance data distribution determination processing which is performed by the drive controlling unit 114 (that is, by the distance calculating part 115 and the distance data distribution determining part 116).

At Step 001, after various initialization processing is performed in response to power-on of the image pickup system, the drive controlling unit 114 starts the distance data distribution determination processing which will be described below.

At Step 002, the distance calculating part 115 calculates the object distance (distance data) in each of the ranging areas by using the paired image signals for each of the ranging areas, which are input from the phase difference sensor 112. This makes it possible to simultaneously obtain the object distances in the respective ranging areas, in other words, the plural object distances.

At Step 003 and Step 006, the distance data distribution determining part 116 determines the distance range in which the calculated (detected) plural object distances are distributed. Specifically, the distance data distribution determining part 116 determines in which one of a close side (Near side) distance range and an infinite side (Far side) distance range more object distances of the plural object distances are distributed than the other. In the following description, the one distance range in which the more object distances are distributed than the other is referred to as the "first distance range", and the other distance range different from the first distance range is referred to as the "second distance range". When the plural object distances are distributed without bias over the entire distance range from the Near side distance range to the Far side distance range, the distance data distribution determining part 116 determines that the distance range in which the object distances are distributed is the entire distance range.

At Step 003, the distance data distribution determining part 116 determines whether or not more object distances are distributed in the Far side distance range than the Near side distance range (that is, whether or not the first distance range is the Far side distance range). The processing proceeds to Step 004 if determined that the more object distances of the plural object distances are distributed in the Far side distance range, and proceeds to Step 006 if determined that the more object distances are not distributed in the Far side distance range.

At Step 004, the distance data distribution determining part 116 sets its determination result to "Far". Then, the processing proceeds to Step 005.

At Step 006, the distance data distribution determining part 116 determines whether or not the more object distances of the plural object distances are distributed in the Near side distance range (that is, whether or not the first distance range is the Near side distance range). The processing proceeds to Step 007 if determined that that the more plural object distances are distributed in the Near side distance range, and proceeds to Step 008 if determined that the more object distances are not distributed in the near distance range.

At Step 007, the distance data distribution determining part 116 sets the determination result to "Near". Then, the processing proceeds to Step 005. At Step 008, the distance data distribution determining part 116 sets the determination result to "Standard". Then, the processing proceeds to Step 005.

At Step 005, the distance data distribution determining part 116 sends the set determination result to the focus controller 117. Then, the processing proceeds to Step 009 where the drive controlling unit 114 ends the processing.

Figure 3:
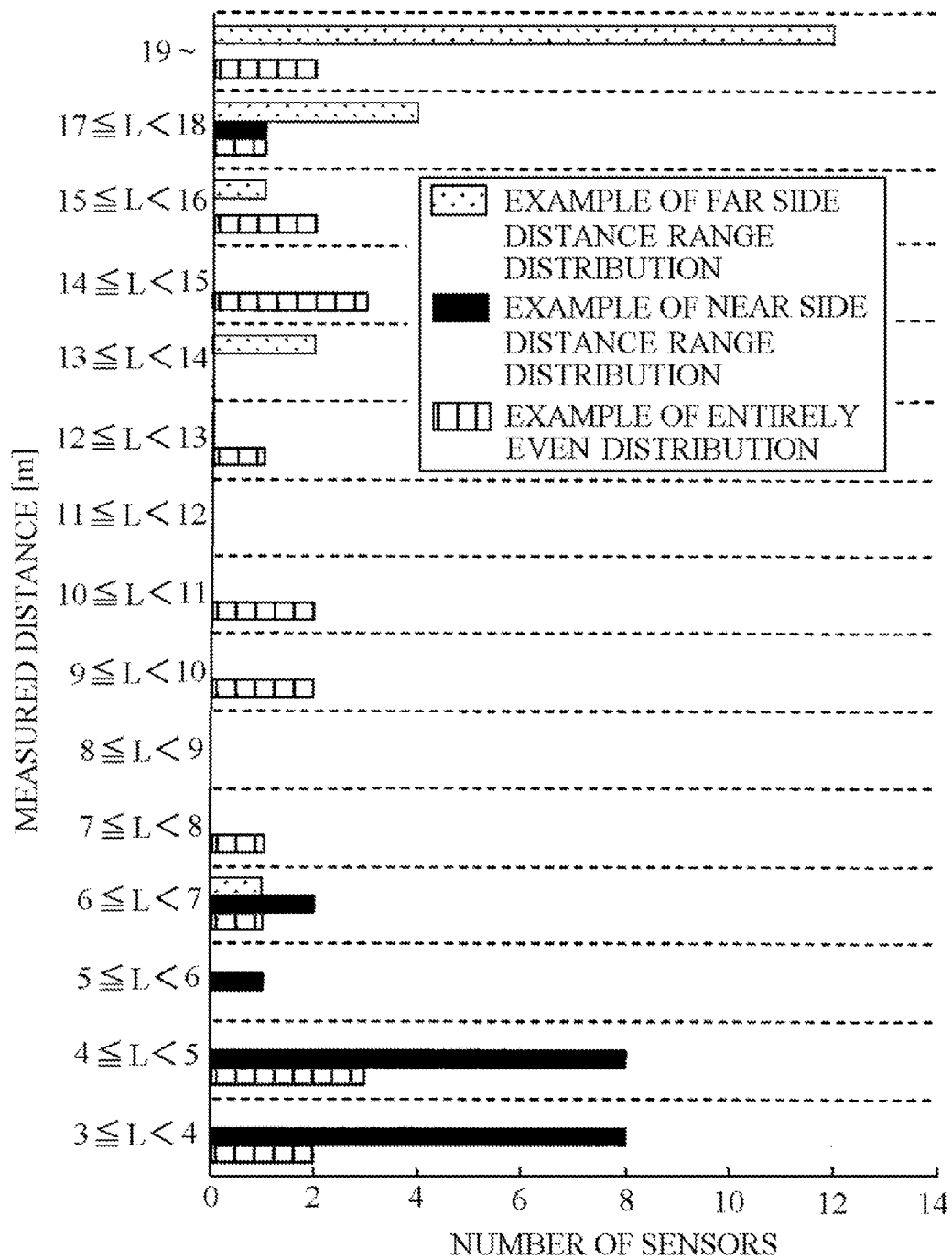
FIG. 3 shows distribution examples of object distances in Embodiment 1.

FIG. 3 shows examples of distribution of the object distances calculated in the respective ranging areas at Step 002. A horizontal axis in FIG. 3 represents the number of the paired line sensors in the phase difference sensor 112, which corresponds to the number of the ranging areas. A vertical axis in FIG. 3 represents a range of measured distances (object distances) L. The Near side and Far side distance ranges may be divided from each other at an arbitrary distance as a threshold distance. For example, the Near side distance range may be defined as a distance range of 10 m or less, and the Far side distance range may be defined as a distance range farther than 10 m.

As shown in FIG. 3, in a case where more measured distances are distributed in the Far side distance range than in the Near side distance range (that is, where the first distance range is the Far side distance range), the determination result is set to "Far" at Step 004. In a case where more measured distances are distributed in the Near side distance range than in the Far side distance range (that is, where the first distance range is the Near side distance range), the determination result is set to "Near" at Step 007. In a case where all of the measured distances are evenly distributed over the entire distance range including the far and Near side distance ranges, the determination result is set to "Standard" at Step 008.

Figure 4:
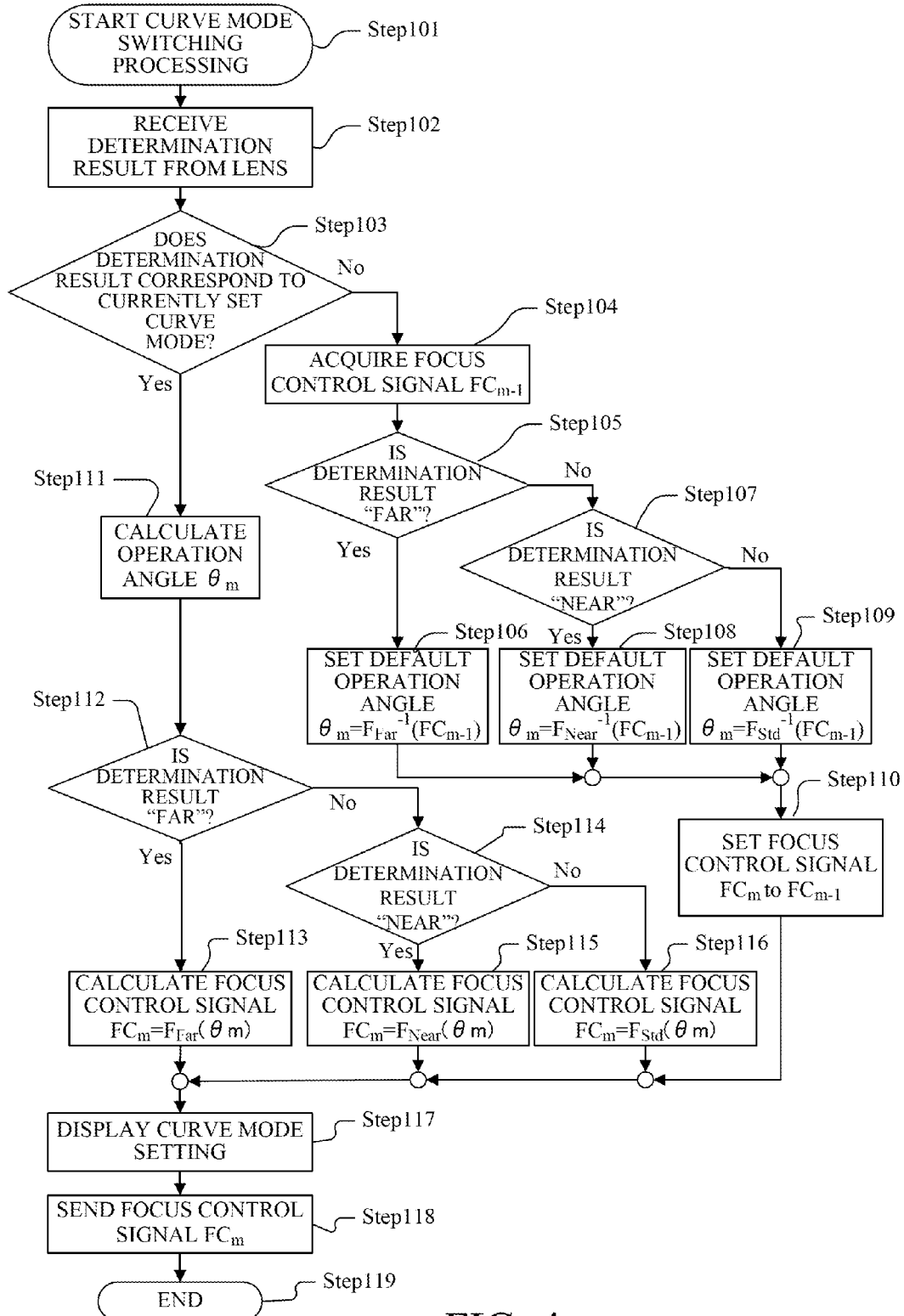
FIG. 4 is a flowchart showing processing performed in a focus controller in Embodiment 1.

A flowchart of FIG. 4 shows curve mode switching processing performed by the focus controller 117 (that is, by the automatic curve mode setting processing part 118, the operation angle detecting part 120, the focus control calculating part 121 and the curve mode setting state displaying part 119).

At step 101, after various initialization processing is performed in response to the power-on of the image pickup system, the focus controller 117 starts the curve mode switching processing which will be described below.

At Step 102, the automatic curve mode setting processing part 118 receives the determination result by the distance data distribution determination processing sent from the lens apparatus 100. Then, the processing proceeds to Step 103.

At Step 103, the automatic curve mode setting processing part 118 determines whether or not the received determination result corresponds to the currently set curve mode (Far mode, Near mode or Standard mode). The processing proceeds to Step 111 if determined that the received determination result corresponds to the currently set curve mode, and proceeds to Step 104 if determined that the received determination result does not correspond to the currently set curve mode.

At Step 104, the automatic curve mode setting processing part 118 acquires $FC_{m-1}$ that is a current value of the focus control signal (FC). Then, the processing proceeds to Step 105.

At Step 105, the automatic curve mode setting processing part 118 determines whether or not the received determination result is "Far". The processing proceeds to Step 106 if the received determination result is "Far", and proceeds to Step 107 if the received determination result is not "Far".

At Step 106, the automatic curve mode setting processing part 118 sets the curve mode to the Far mode, and notifies to the focus control calculating part 121 and the curve mode setting state displaying part 119 that the set curve mode is the Far mode. The focus control calculating part 121 calculates an operation angle $\theta_m$ of the focus operating knob which causes the focus control signal to be $FC_{m-1}$ in the Far mode. Then, the focus control calculating part 121 sets the calculation result to a reference operation angle (default operation angle) of the focus operating knob at which $FC_{m-1}$ is output after switching of the curve mode to the Far mode. Thereafter, the processing proceeds to Step 110.

The reference operation angle $\theta_m$ is calculated from $\theta_m = F_{Far}^{-1}(FC_{m-1})$ that is an inverse function of $FC = F_{Far}(\theta)$ expressing a relationship between the operation angle $\theta$ of the focus operating knob and the focus control signal FC in the Far mode.

At Step 107, the automatic curve mode setting processing part 118 determines whether or not the received determination result is "Near". The processing proceeds to Step 108 if the received determination result is "Near", and proceeds to Step 109 if the received determination result is not "Near".

At Step 108, the automatic curve mode setting processing part 118 sets the curve mode to the Near mode, and notifies to the focus control calculating part 121 and the curve mode setting state displaying part 119 that the set curve mode is the Near mode. The focus control calculating part 121 calculates the operation angle $\theta_m$ of the focus operating knob which causes the focus control signal to be in the Near mode. Then, the focus control calculating part 121 sets the calculation result to the reference operation angle (default operation angle) of the focus operating knob at which $FC_{m-1}$ is output after switching of the curve mode to the Near mode. Thereafter, the processing proceeds to Step 110.

The reference operation angle $\theta_m$ is calculated from $\theta_m = F_{Near}^{-1}(FC_{m-1})$ that is an inverse function of $FC = F_{Near}(\theta)$ expressing the relationship between the operation angle $\theta$ of the focus operating knob and the focus control signal FC in the Near mode.

At Step 109, the automatic curve mode setting processing part 118 sets the curve mode to the Standard mode, and notifies to the focus control calculating part 121 and the curve mode setting state displaying part 119 that the set curve mode is the Standard mode. The focus control calculating part 121 calculates the operation angle $\theta_m$ of the focus operating knob which causes the focus control signal to be $FC_{m-1}$ in the Standard mode. Then, the focus control calculating part 121 sets the calculation result to the reference operation angle (default operation angle) of the focus operating knob at which $FC_{m-1}$ is output after switching of the curve mode to the Standard mode. Thereafter, the processing proceeds to Step 110.

The reference operation angle $\theta_m$ is calculated from $\theta_m = F_{std}^{-1}(FC_{m-1})$ that is an inverse function of $FC = F_{std}(\theta)$ expressing the relationship between the operation angle $\theta$ of the focus operating knob and the focus control signal FC in the Standard mode.

At Step 110, the focus control calculating part 121 sets the focus control signal $FC_m$ to $FC_{m-1}$. Then, the processing proceeds to Step 117.

At Step 111, the focus control calculating part 121 calculates the operation angle $\theta_m$ of the focus operating knob. Then, the processing proceeds to Step 112.

At Step 112, the automatic curve mode setting processing part 118 determines whether or not the determination result received from the lens apparatus 100 is "Far". The processing proceeds to Step 113 if the received determination result is "Far", and proceeds to Step 114 if the received determination result is not "Far".

At Step 113, the focus control calculating part 121 calculates the focus control signal $FC_m$ ($=F_{Far}(\theta_m)$). Then, the processing proceeds to Step 117.

At Step 114, the automatic curve mode setting processing part 118 determines whether or not the determination result received from the lens apparatus 100 is "Near". The processing proceeds to Step 115 if the received determination result is "Near", and proceeds to Step 116 if the received determination result is not "Near".

At Step 115, the focus control calculating part 121 calculates the focus control signal $FC_m$ ($=F_{Near}(\theta_m)$). Then, the processing proceeds to Step 117.

At Step 116, the focus control calculating part 121 calculates the focus control signal $FC_m$ ($=F_{std}(\theta_m)$). Then, the processing proceeds to Step 117.

At Step 117, the curve mode setting state displaying part 119 displays the curve mode notified at Step 106, 108 or 109. Then, the processing proceeds to Step 118.

At Step 118, the focus control calculating part 121 sends the calculated focus control signal $FC_m$ to the lens apparatus 100. Then, the processing proceeds to Step 119 where the focus controller 117 ends the curve mode switching processing.

Figure 5:
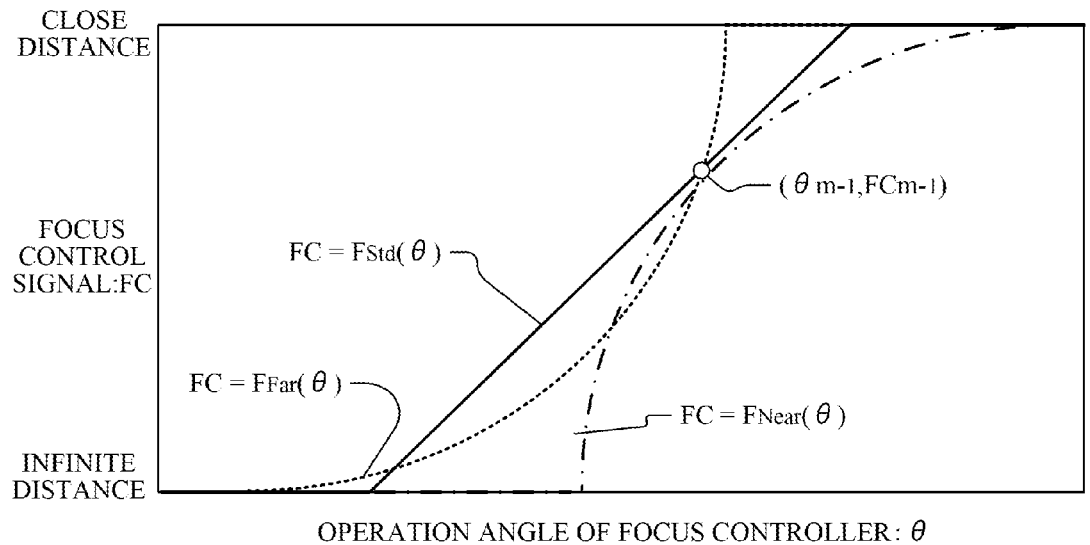
FIG. 5 shows focus operation sensitivity being set in Embodiment 1.

FIG. 5 shows focus curves each of which is data for deciding the relationship of the focus control signal FC (that is, the position of the focus lens 101) to the operation angle of the focus controller (focus operating knob) 117 in each of the Far, Near and Standard modes. A horizontal axis in FIG. 5 represents the operation angle $\theta$ of the focus controller 117, and a vertical axis represents the focus control signal FC. The focus curves for the Far, Near and Standard modes are respectively shown by $FC = F_{Far}(\theta)$, $FC = F_{Near}(\theta)$ and $Fc = F_{std}(\theta)$.

The focus curve for the Standard mode is set such that the focus control signal FC is linearly changed with respect to the operation angle θ of the focus controller 117 from the close distance end to the infinite distance end.

On the other hand, the focus curve for the Far mode is set such that a change amount of the focus control signal FC with respect to a change amount of the operation angle θ of the focus controller 117 (that is, a change amount of the position of the focus lens 101) is smaller in an infinite distance side area than in a close distance side area. The focus curve for the Near mode is set such that the change amount of the focus control signal FC with respect to the change amount of the operation angle θ of the focus controller 117 is smaller in the close distance side area than in the infinite distance side area.

Thus, in the Far mode and the Near mode, a characteristic of the focus position control is set such that the focus operation sensitivity for the first distance range where many of the object distances are distributed is lower than that for the second distance range different from the first distance range. This makes it possible that a small operation amount of the focus controller 117 causes the focus lens 101 to move widely from a movable area corresponding to the second distance range to that corresponding to the first distance range. Further, it makes it possible that the focus lens 101 is moved in minute steps to perform fine focus adjustment in the first distance range.

Although this embodiment has showed the three focus curves in FIG. 5, the shape of the focus curve which is selected (created) by the automatic curve mode setting processing part 118 and shows the relationship between the operation amount of the focus operating member and the movement amount of the focus lens (that is, a movement amount of an in-focus position) is not limited thereto. For example, the focus curve may be formed such that the movement amount of the focus lens to the operation amount of the focus operating member is smaller in a certain continuous distance range than that in another distance range, or such that the movement amount of the focus lens to the operation amount of the focus operating member is smaller in distance ranges separate from each other than that in another distance range.

An intersection $(θ_{m-1}, FC_{m-1})$ of the three focus curves in FIG. 5 shows a point where the processing of FIG. 4 proceeds from Step 103 to Step 104 according to the determination at Step 103 that the current curve mode is different from the curve mode corresponding to the determination result received from the lens apparatus 100. Switching the curve mode at this point does not change the focus control signal before and after the switching of the curve mode, thereby making it possible to prevent a sudden movement of the focus lens 101.

Thus, this embodiment can automatically set appropriate focus operation sensitivity corresponding to the distance range where the object distances are distributed.

Embodiment 2

Next, description will be made of a second embodiment (Embodiment 2) of the present invention. A configuration of an image pickup system of this embodiment is the same as that of Embodiment 1 shown in FIG. 1A.

Figure 6:
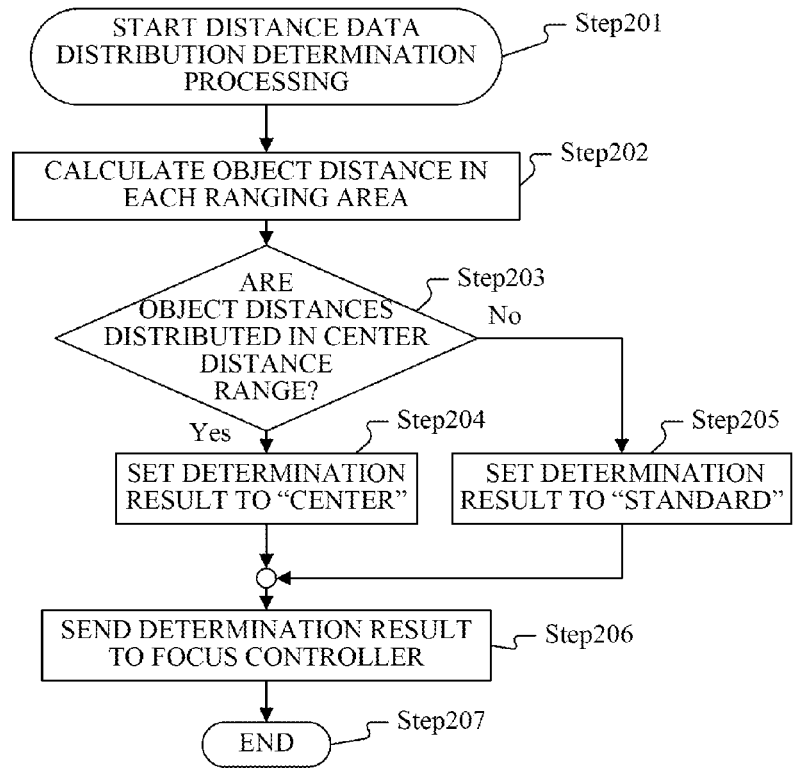
FIG. 6 is a flowchart showing processing in a drive controlling unit in Embodiment 2 of the present invention.

A flowchart of FIG. 6 shows distance data distribution determination processing performed by the drive controlling unit 114 (that is, by the distance calculating part 115 and the distance data distribution determining part 116) in this embodiment.

At Step 201, after various initialization processing is performed in response to power-on of the image pickup system, the drive controlling unit 114 starts the distance data distribution determination processing which will be described below.

At Step 202, the distance calculating part 115 calculates the object distance (distance data) in each of the ranging areas by using the paired image signals for each of the ranging areas, which are input from the phase difference sensor 112. This makes it possible to simultaneously obtain the object distances in the respective ranging areas, in other words, the plural object distances.

At Step 203, the distance data distribution determining part 116 determines whether or not more object distances of the plural object distances are distributed in a middle (Center) distance range of the entire distance range from the close distance end to the infinite distance end than other distance ranges (that is, whether or not the first distance range is the "Center distance range"). The Center distance range is a distance range between the Far side distance range and the Near side distance range. The Far side, Near side and Center distance ranges may be divided from each other at arbitrary distances as threshold distances. For example, the Near side distance range may be defined as a distance range of 6 m or less, the Far side distance range may be defined as a distance range farther than 14 m, and the Center distance range may be defined as a distance range from 6 m to 14 m. The processing proceeds to Step 204 if determined that the more object distances are distributed in the Center distance range, and proceeds to Step 205 if determined that the more object distances are not distributed in the Center distance range.

At Step 204, the distance data distribution determining part 116 sets its determination result to "Center". Then, the processing proceeds to Step 206.

At Step 205, the distance data distribution determining part 116 sets the determination result to "Standard". Then, the processing proceeds to Step 206.

At Step 206, the distance data distribution determining part 116 sends the set determination result to the focus controller 117. Then, the processing proceeds to Step 207 where the drive controlling unit 114 ends the distance data distribution determination processing.

Figure 7:
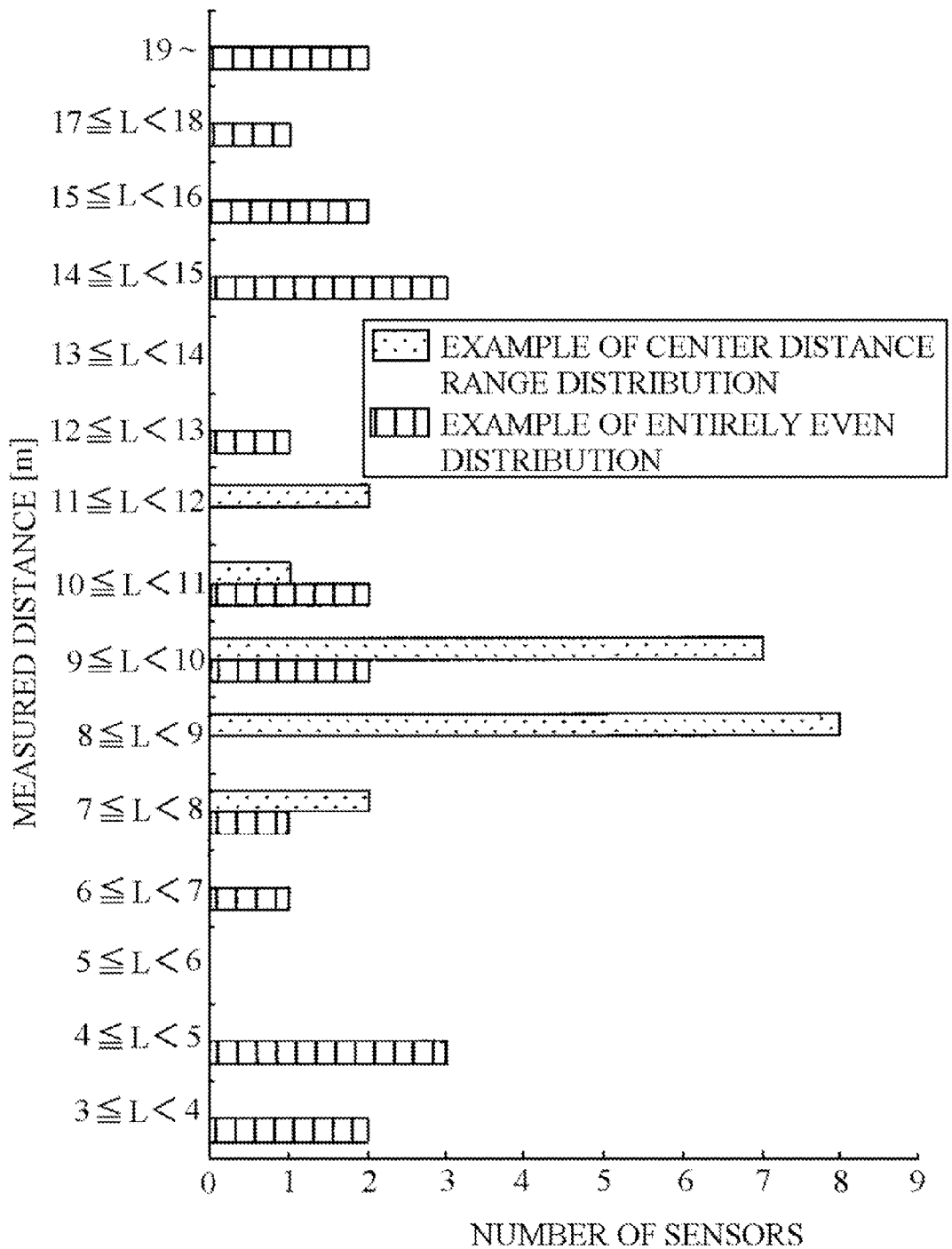
FIG. 7 shows distribution examples of object distances in Embodiment 2.

FIG. 7 shows examples of distribution of the object distances calculated in the respective ranging areas at Step 202. A horizontal axis in FIG. 7 represents the number of the paired line sensors in the phase difference sensor 112, which corresponds to the number of the ranging areas. A vertical axis in FIG. 7 represents a range of measured distances (object distances) L.

As shown in FIG. 7, in a case where more measured distances are distributed in the Center distance range than in the far and near side distance ranges (that is, where the first distance range is the Center distance range), the determination result is set to "Center" at Step 204. In a case where all of the measured distances are evenly distributed over the entire distance range, the determination result is set to "Standard" at Step 205.

Figure 8:
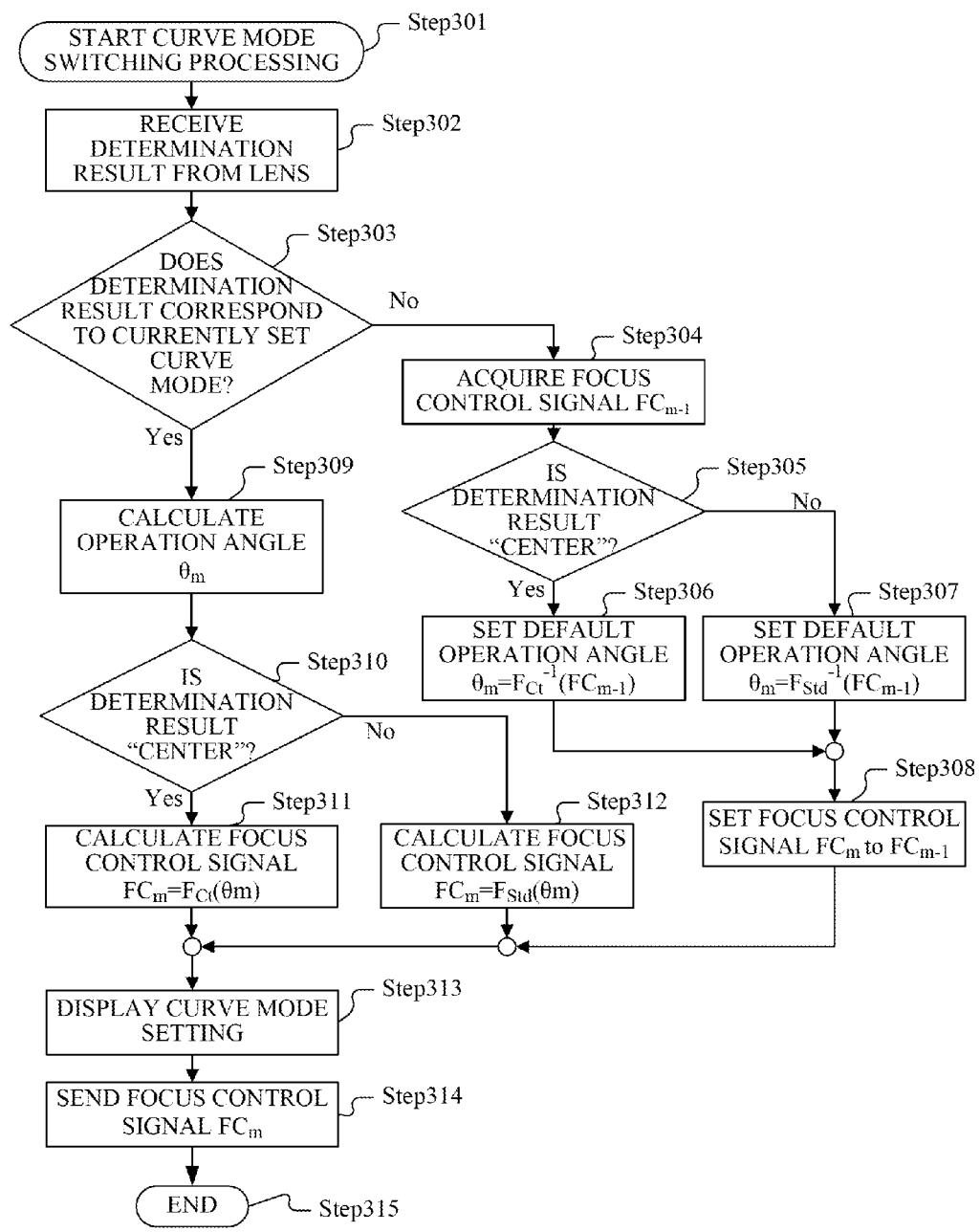
FIG. 8 is a flowchart showing processing performed in a focus controller in Embodiment 2.

A flowchart of FIG. 8 shows curve mode switching processing performed by the focus controller 117 (that is, by the automatic curve mode setting processing part 118, the operation angle detecting part 120, the focus control calculating part 121 and the curve mode setting state displaying part 119).

At step 301, after various initialization processing is performed in response to the power-on of the image pickup system, the focus controller 117 starts the curve mode switching processing which will be described below.

At Step 102, the automatic curve mode setting processing part 118 receives the determination result by the distance data distribution determination processing sent from the lens apparatus 100. Then, the processing proceeds to Step 303.

At Step 303, the automatic curve mode setting processing part 118 determines whether or not the received determination result corresponds to the currently set curve mode (Center mode or Standard mode). The processing proceeds to Step 309 if the received determination result corresponds to the currently set curve mode, and proceeds to Step 304 if the received determination result does not correspond to the currently set curve mode.

At Step 304, the automatic curve mode setting processing part 118 acquires $FC_{m-1}$ that is a current value of the focus control signal (FC). Then, the processing proceeds to Step 305.

At Step 305, the automatic curve mode setting processing part 118 determines whether or not the received determination result is "Center". The processing proceeds to Step 306 if the received determination result is "Center", and proceeds to Step 307 if the received determination result is not "Center".

At Step 306, the automatic curve mode setting processing part 118 sets the curve mode to the Center mode, and notifies to the focus control calculating part 121 and the curve mode setting state displaying part 119 that the set curve mode is the Center mode. The focus control calculating part 121 calculates an operation angle $\theta_m$ of the focus operating knob which causes the focus control signal to be $FC_{m-1}$ in the Center mode. Then, the focus control calculating part 121 sets the calculation result to a reference operation angle (default operation angle) of the focus operating knob at which $FC_{m-1}$ is output after switching of the curve mode to the Center mode. Thereafter, the processing proceeds to Step 308.

The reference operation angle $\theta_m$ is calculated from $\theta_m = F_{Ct}^{-1}(FC_{m-1})$ that is an inverse function of $FC = F_{Ct}(\theta)$ expressing the relationship between the operation angle $\theta$ of the focus operating knob and the focus control signal FC in the Center mode.

At Step 307, the automatic curve mode setting processing part 118 sets the curve mode to the Standard mode, and notifies to the focus control calculating part 121 and the curve mode setting state displaying part 119 that the set curve mode is the Standard mode. The focus control calculating part 121 calculates the operation angle $\theta_m$ of the focus operating knob which causes the focus control signal to be $FC_{m-1}$ in the Standard mode. Then, the focus control calculating part 121 sets the calculation result to the reference operation angle (default operation angle) of the focus operating knob at which $FC_{m-1}$ is output after switching of the curve mode to the Standard mode. Thereafter, the processing proceeds to Step 308.

The reference operation angle $\theta_m$ is calculated from $\theta_m = F_{std}^{-1}(FC_{m-1})$ that is an inverse function of $FC = F_{std}(\theta)$ expressing the relationship between the operation angle $\theta$ of the focus operating knob and the focus control signal FC in the Standard mode.

At Step 308, the focus control calculating part 121 sets the focus control signal $FC_m$ to $FC_{m-1}$. Then, the processing proceeds to Step 313.

At Step 309, the focus control calculating part 121 calculates the operation angle $\theta_m$ of the focus operating knob. Then, the processing proceeds to Step 310.

At Step 310, the automatic curve mode setting processing part 118 determines whether or not the determination result received from the lens apparatus 100 is "Center". The processing proceeds to Step 311 if the received determination result is "Center", and proceeds to Step 312 if the received determination result is not "Center".

At Step 311, the focus control calculating part 121 calculates the focus control signal $FC_m$ $(=F_{Ct}(\theta_m))$. Then, the processing proceeds to Step 313.

At Step 312, the focus control calculating part 121 calculates the focus control signal $FC_m$ $(=F_{std}(\theta_m))$. Then, the processing proceeds to Step 313.

At Step 313, the curve mode setting state displaying part 119 displays the curve mode notified at Step 306 or 307. Then, the processing proceeds to Step 314.

At Step 314, the focus control calculating part 121 sends the calculated focus control signal $FC_m$ to the lens apparatus 100. Then, the processing proceeds to Step 315 where the focus controller 117 ends the curve mode switching processing.

Figure 9:
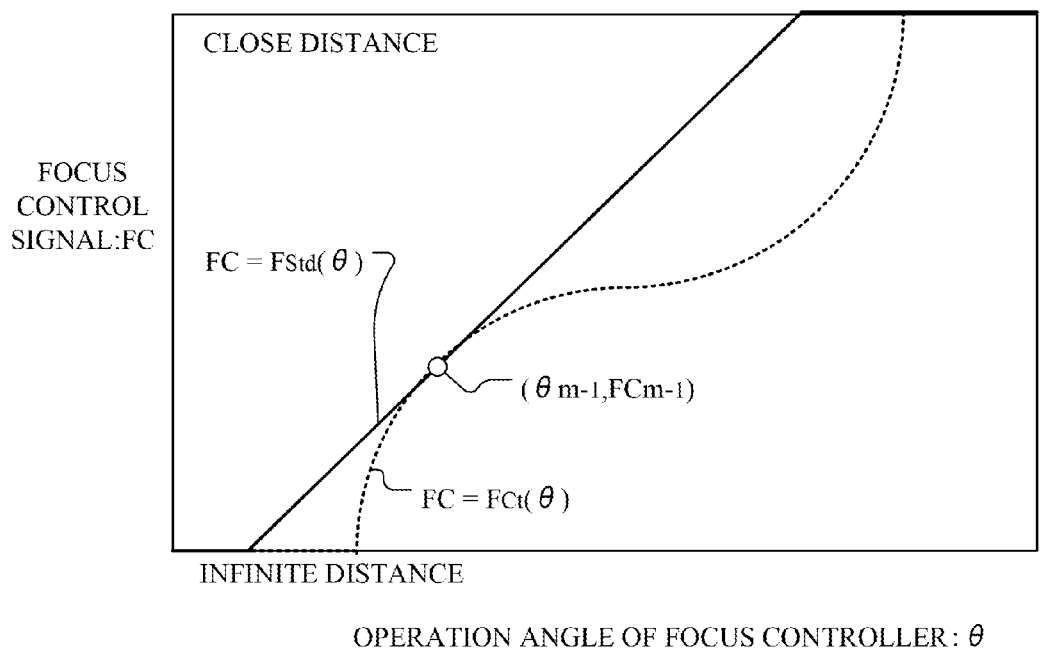
FIG. 9 shows focus operation sensitivity being set in Embodiment 2.

FIG. 9 shows focus curves each of which is data for deciding the relationship of the focus control signal FC (that is, the position of the focus lens 101) to the operation angle of the focus controller (focus operating knob) 117 in each of the Center and Standard modes. A horizontal axis in FIG. 9 represents the operation angle $\theta$ of the focus controller 117, and a vertical axis represents the focus control signal FC. The focus curves for the Center and Standard modes are respectively shown by $FC = F_{Ct}(\theta)$ and $FC = F_{std}(\theta)$.

The focus curve for the Standard mode is set such that the focus control signal FC is linearly changed with respect to the operation angle $\theta$ of the focus controller 117 from the close distance end to the infinite distance end.

On the other hand, the focus curve for the Center mode is set such that a change amount of the focus control signal FC with respect to a change amount of the operation angle $\theta$ of the focus controller 117 increases as the position of the focus lens 101 becomes closer to the close distance end and the infinite distance end, and decreases in the middle distance range.

Thus, in the Center mode, a characteristic of the focus position control is set such that the focus operation sensitivity for the first distance range where many of the object distances are distributed is lower than that for the second distance range different from the first distance range. This makes it possible that a small operation amount of the focus controller 117 causes the focus lens 101 to move widely from a movable area corresponding to the second distance range to that corresponding to the first distance range. Further, it makes it possible that the focus lens 101 is moved in minute steps to perform fine focus adjustment in the first distance range.

An intersection $(\theta_{m-1}, FC_{m-1})$ of the two focus curves in FIG. 9 shows a point where the processing of FIG. 8 proceeds from Step 303 to Step 304 according to the determination at Step 303 that the current curve mode is different from the curve mode corresponding to the determination result received from the lens apparatus 100. Switching the curve mode at this point does not change the focus control signal before and after the switching of the curve mode, thereby making it possible to prevent a sudden movement of the focus lens 101.

Thus, this embodiment also can automatically set appropriate focus operation sensitivity corresponding to the distance range where the object distances are distributed.

Embodiment 3

Figure 10A:
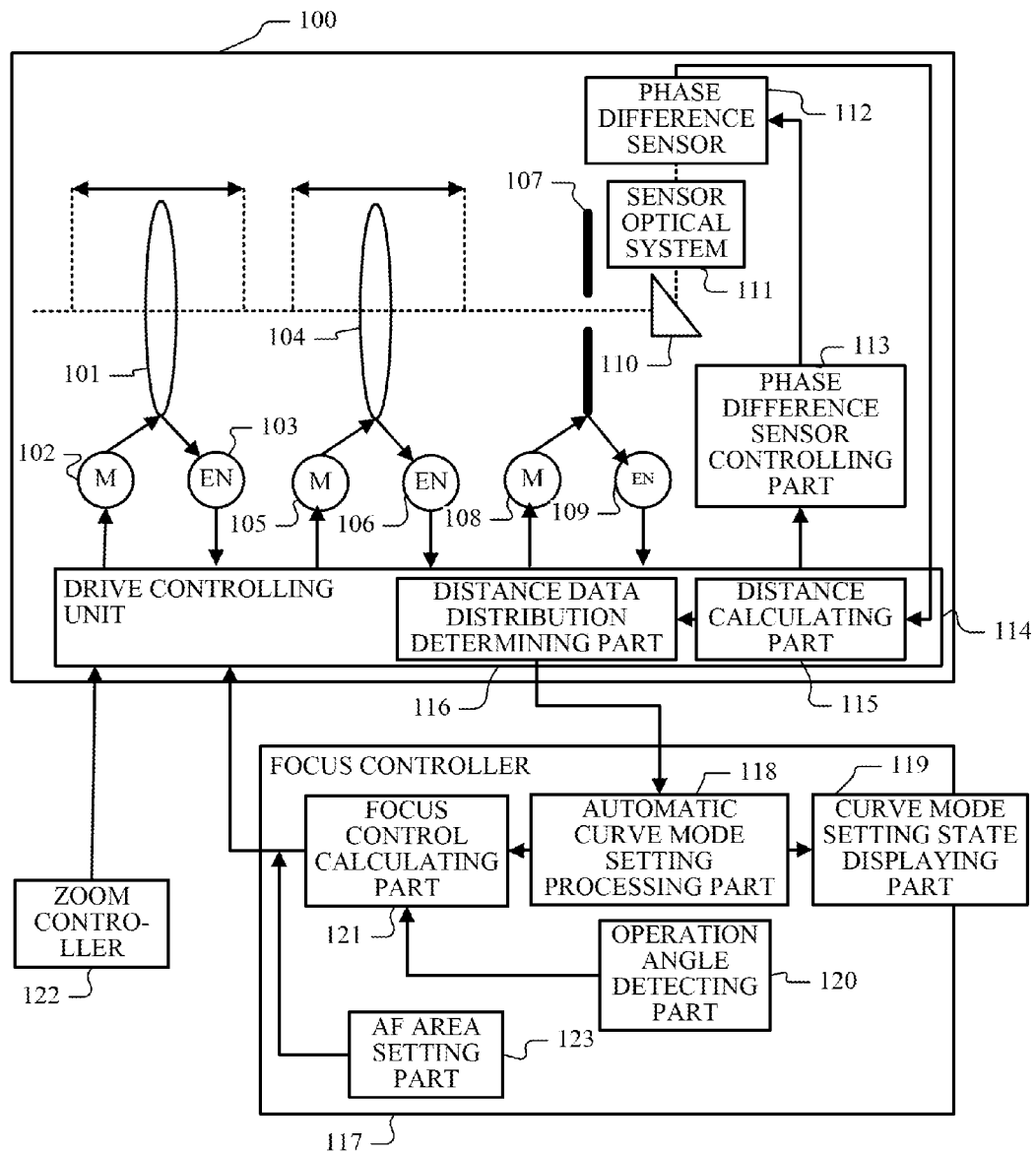
FIG. 10A shows a configuration of an image pickup system that is Embodiment 3 of the present invention.

FIG. 10A shows a configuration of an image pickup system that is a third embodiment (Embodiment 3) of the present invention. Components in Embodiment 3 identical to those in Embodiment 1 (FIG. 1A) are denoted by the same reference numerals as those in Embodiment 1, and their descriptions are omitted. In FIG. 10A, a camera corresponding to the camera 200 shown in FIG. 1A is omitted.

In FIG. 10A, reference numeral 123 denotes an AF area setting part serving as a focus detection area setting part. The AF area setting part 123 sets in the image pickup frame, according to a user's operation or automatically, a size and a position of an AF area (focus detection area) where detection of a focus state of the lens apparatus 100 and focus control thereof are performed by AF (auto focus).

Figure 10B:
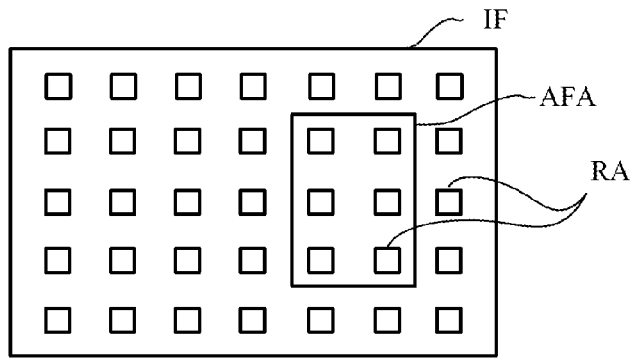
FIG. 10B shows an arrangement example of ranging areas in Embodiment 3.

FIG. 10B shows that the AF area AFA set in the image pickup frame IF includes plural ranging areas RA which are part of all ranging areas.

Figure 11:
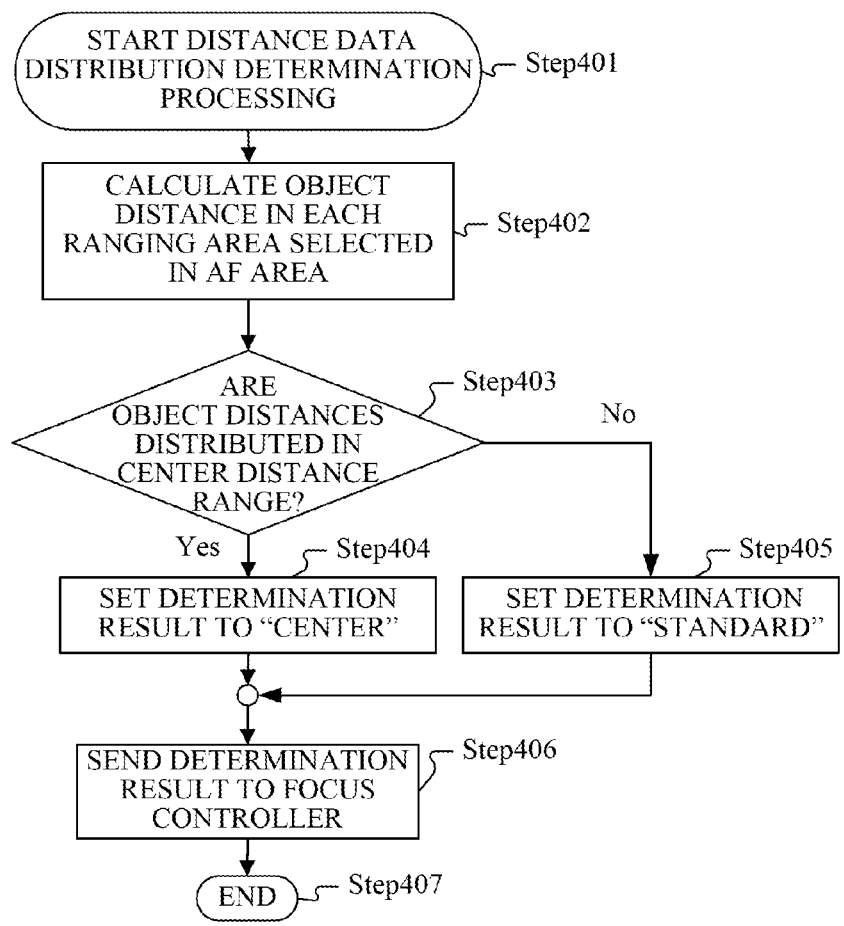
FIG. 11 is a flowchart showing processing in a drive control unit in Embodiment 3.

A flowchart of FIG. 11 shows distance data distribution determination processing performed by the drive control unit 114 (that is, by the distance calculating part 115 and the distance data distribution determining part 116).

Processes at Step 401 and Steps 403 to 407 are the same as those at Step 201 and Steps 203 to 207 in Embodiment 2 (FIG. 6), respectively.

At Step 402, the distance calculating part 115 calculates an object distance (distance data) in each of the ranging areas RA in the AF area AFA set by the AF area setting part 123 by using the paired image signals for each of the ranging areas RA, the paired image signals being input from the phase difference sensor 112. This makes it possible to simultaneously obtain the object distances in the respective ranging areas RA included in the AF area AFA, in other words, plural object distances. Then, the processing proceeds to Step 403.

Figure 12:
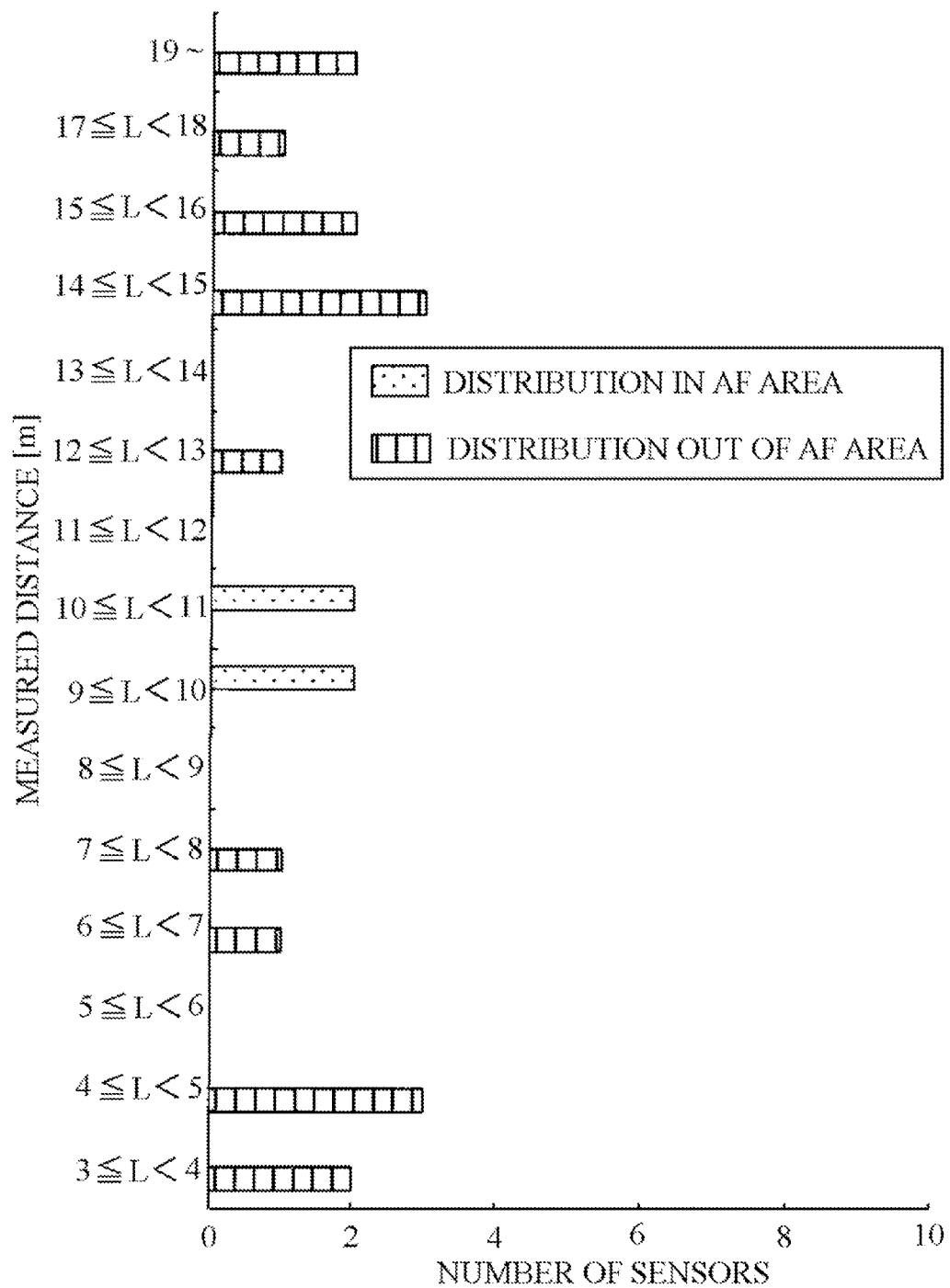
FIG. 12 shows a distribution example of object distances in Embodiment 3.

FIG. 12 shows an example of distribution of the object distances calculated in the respective ranging areas RA at Step 402. A horizontal axis in FIG. 12 represents the number of the paired line sensors in the phase difference sensor 112, which corresponds to the number of the ranging areas RA. A vertical axis in FIG. 12 represents a range of measured distances (object distances) L.

As shown in FIG. 12, although the object distances obtained in the all ranging areas in the image pickup frame are evenly distributed in the entire distance range, the object distances obtained in the ranging areas RA included in the AF area AFA are distributed within a middle (Center) distance range between an infinite side (Far side) distance range and a close side (Near side) distance range. In this case, the distance data distribution determining part 116 sets its determination result to "Center" at Step 403.

Curve mode switching processing performed by the focus controller 117 in this embodiment is the same as that in Embodiment 2 (FIG. 8). Moreover, focus curves set in this embodiment are the same as those in Embodiment 2 (FIG. 9).

As described above, this embodiment can automatically set appropriate focus operation sensitivity corresponding to the distance range where the object distances calculated in the AF area are distributed. The AF area is an area where an object(s) whose image is desired to be captured by a user exists. Thus, this embodiment can prevent the focus operation sensitivity from being changed due to change of the object distance in an area whose image is not intended to be captured by the user.

Although this embodiment has described the case where the object distance distribution determination is made for the ranging areas included in the AF area, the object distance distribution determination may be made for part of all ranging areas arbitrarily selected by a user without relation to the AF area.

Further, the distance data distribution determining part 116 may weight the object distances calculated in the ranging areas included in the AF area or selected by the user more heavily than the object distances calculated in other ranging areas, and may make the object distance distribution determination made for theses weighted object distances.

Moreover, although this embodiment has described the case where the curve mode is switched between the Center mode and the Standard mode, the curve mode may be switched among the Far, Near and Standard modes as in Embodiment 1.

Embodiment 4

Next, description will be made of a fourth embodiment (Embodiment 4) of the present invention. A configuration of an image pickup system of this embodiment is the same as that of Embodiment 1 shown in FIG. 1A.

In Embodiments 1 to 3, the distance data distribution determining part 116 simply determines the distance range where the plural object distances calculated by the distance calculating part 115 are distributed. However, in this embodiment, the distance data distribution determining part 116 determines a distance range where at least part of the calculated plural object distances is clustered (collected or grouped). The distance range where the object distances are clustered is hereinafter referred to as the "object distance clustering range" or "object distance collecting (grouping) range". In the object distance clustering range, two or more object distances of the calculated plural object distances are present more densely than in other distance ranges (object distance non-clustering range) in the object distance distribution.

Figure 13:
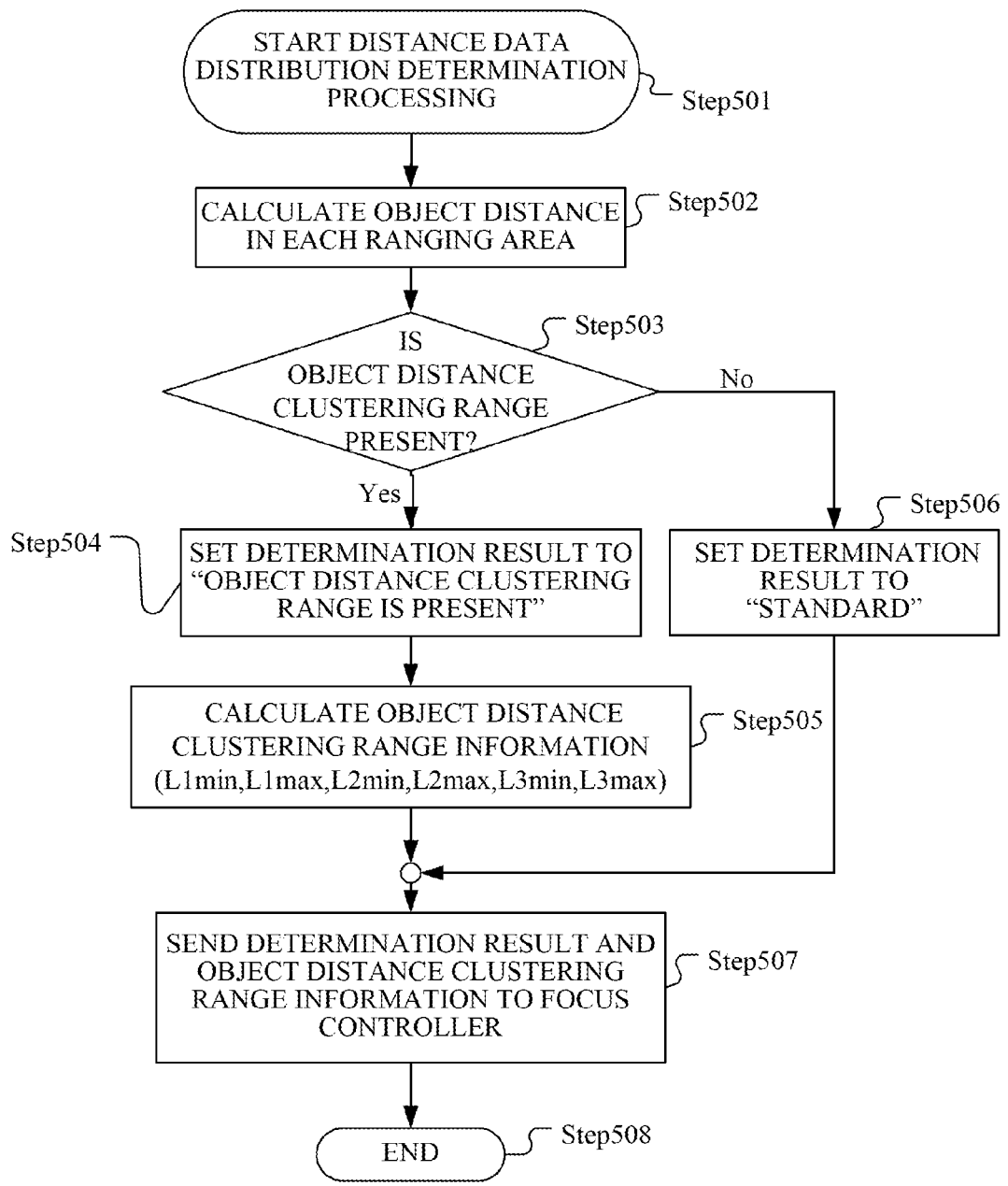
FIG. 13 is a flowchart showing processing in a drive controlling unit in Embodiment 4 of the present invention.

A flowchart of FIG. 13 shows distance data distribution determination processing performed by the drive control unit 114 (that is, by the distance calculating part 115 and the distance data distribution determining part 116).

Processes at Steps 501, 502, 506 and 508 are the same as those at Steps 001, 002, 008 and 009 in Embodiment 1 (FIG. 2), respectively.

At Step 503, the distance data distribution determining part 116 determines whether or not the object distance clustering range where at least part of the plural object distances calculated at Step 502 is clustered is present. The processing proceeds to Step 504 if the object distance clustering range is present, and proceeds to Step 506 if the object distance clustering range is not present.

At Step 504, the distance data distribution determining part 116 sets its determination result to "object distance clustering range is present". Then, the processing proceeds to Step 505.

At Step 505, the distance data distribution determining part 116 calculates information on the object distance clustering range (hereinafter referred to as "object distance clustering range information") (L1min, L1max, L2min, L2max, L3min and L3max). L1min shows a minimum object distance of a first object distance clustering range, and L1max shows a maximum object distance of the first object distance clustering range. Similarly, L2min shows a minimum object distance of a second object distance clustering range, L2max shows a maximum object distance of the second object distance clustering range, L3min shows a minimum object distance of a third object distance clustering range, and L3max shows a maximum object distance of the third object distance clustering range. Then, the processing proceeds to Step 507.

At Step 507, the distance data distribution determining part 116 sends the set determination result and the object distance clustering range information to the focus controller 117. Then, the processing proceeds to Step 508.

Figure 14:
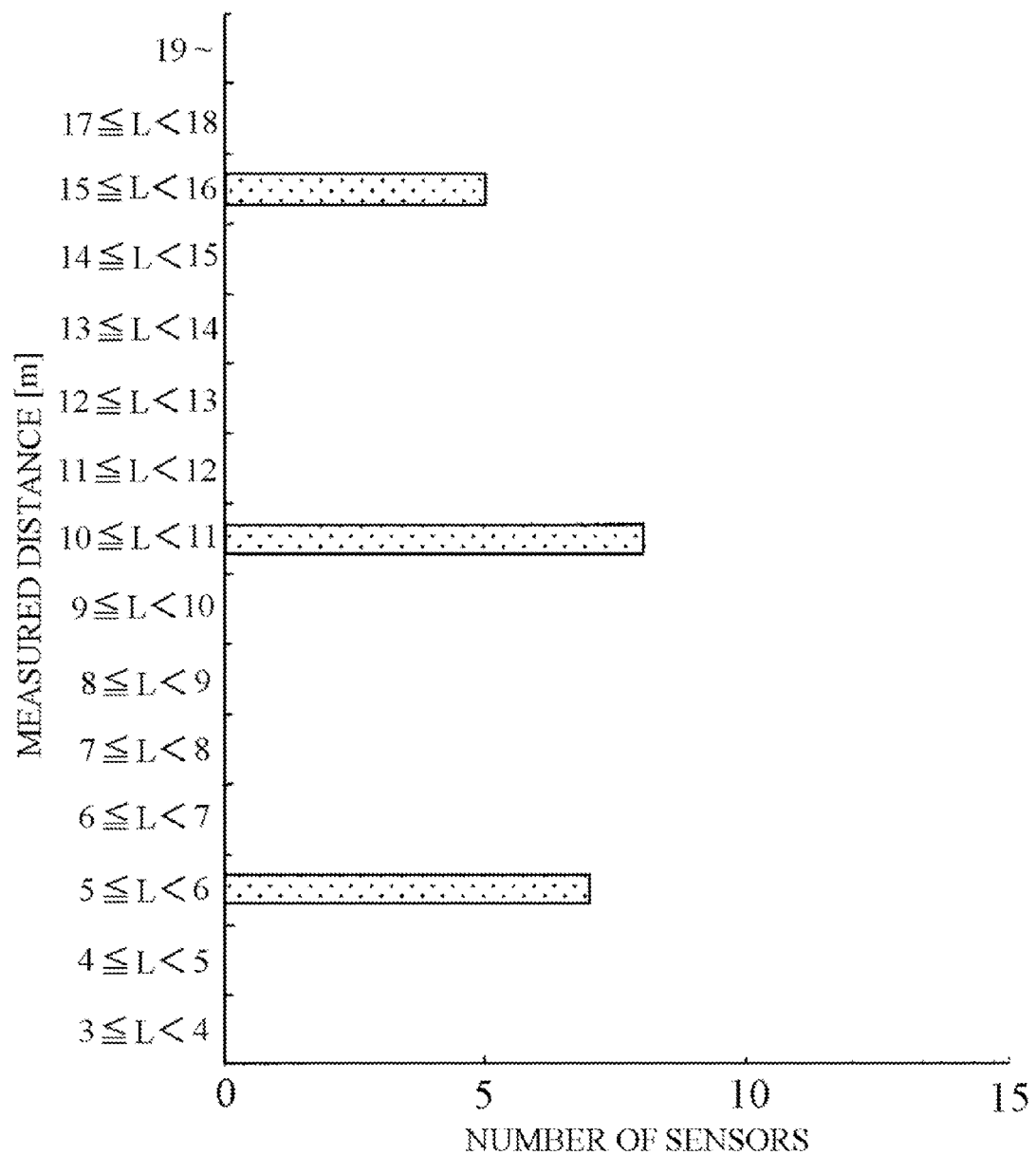
FIG. 14 shows a distribution example of object distances in Embodiment 4.

FIG. 14 shows an example of distribution of the object distances calculated in the respective ranging areas at Step 502. A horizontal axis in FIG. 14 represents the number of the paired line sensors in the phase difference sensor 112, which corresponds to the number of the ranging areas. A vertical axis in FIG. 14 represents a range of measured distances (object distances) L. In FIG. 14, the measured distances are distributed and clustered (collected or grouped) in three object distance clustering ranges. In such a case where the object distance clustering range is present, the determination result is set to "object distance clustering range is present" at Step 504.

Moreover, in the case shown in FIG. 14, L1min, L1max, L2min, L2max, L3min and L3max (object distance clustering range information) are 5 m, 6 m, 10 m, 11 m, 15 m and 16 m, respectively.

When the measured distances are evenly distributed over the entire distance range, the determination result is set to "Standard" at Step 506.

Figure 15:
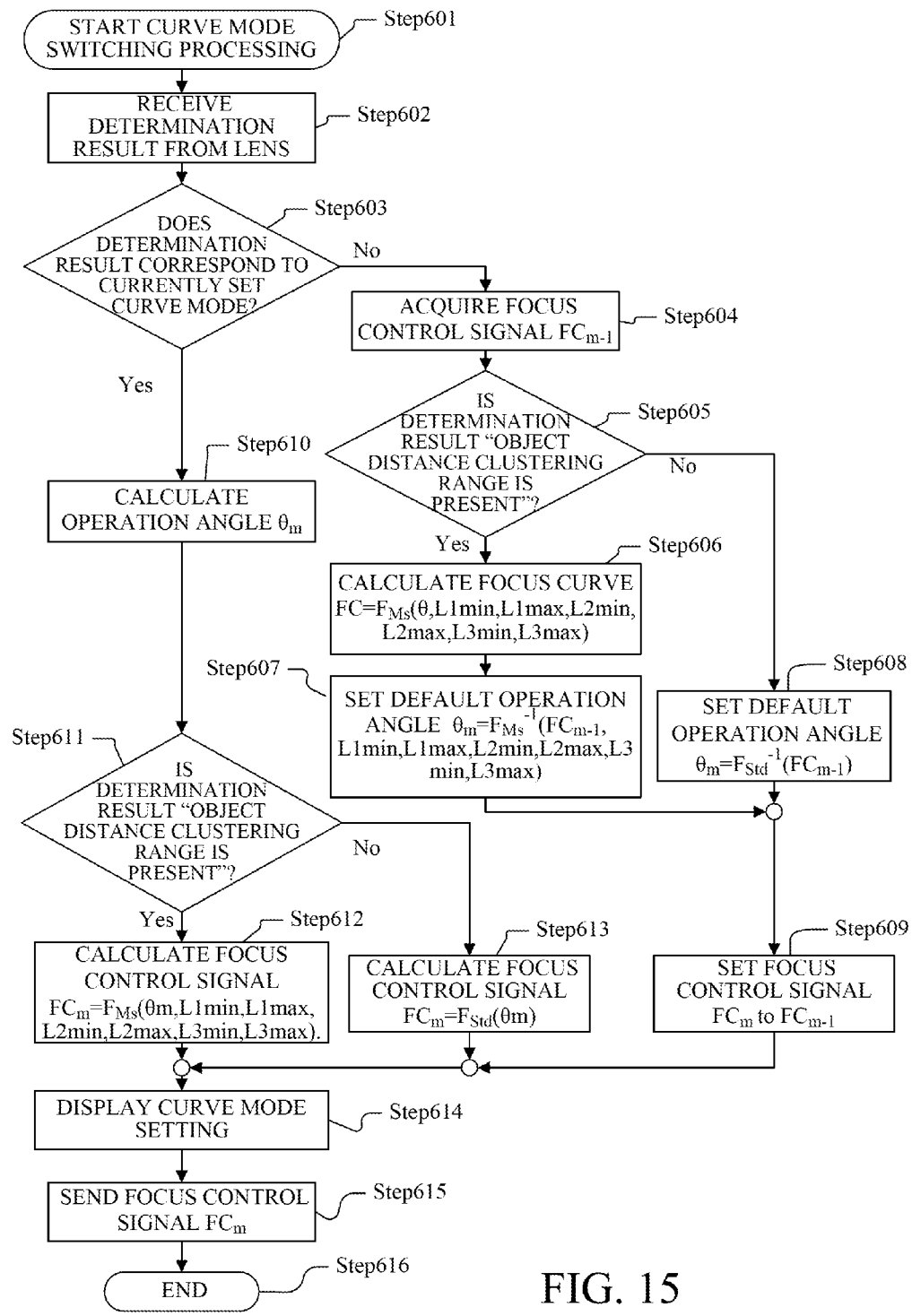
FIG. 15 is a flowchart showing processing performed in a focus controller in Embodiment 4.

A flowchart of FIG. 15 shows curve mode switching processing performed by the focus controller 117 (that is, by the automatic curve mode setting processing part 118, the operation angle detecting part 120, the focus control calculating part 121 and the curve mode setting state displaying part 119). Processes at Steps 601 to 604, Steps 608 to 610 and Steps 613 to 616 in FIG. 15 are the same as those at Steps 101 to 104, Steps 109 to 111 and Steps 116 to 119 in Embodiment 1 (FIG. 4).

At Step 605, the automatic curve mode setting processing part 118 determines whether or not the determination result received from the lens apparatus 100 is "object distance clustering range is present". The processing proceeds to Step 606 if the determination result is "object distance clustering range is present", and proceeds to Step 608 if the determination result is "Standard".

At Step 606, the automatic curve mode setting processing part 118 sets the curve mode to an object distance clustering range presence mode, and notifies to the focus control calculating part 121 and the curve mode setting state displaying part 119 that the set curve mode is the object distance clustering range presence mode. Further, the automatic curve mode setting processing part 118 calculates as follows a focus curve (focus characteristic) in the object distance clustering range presence mode based on the object distance clustering range information (L1min, L1max, L2min, L2max, L3min and L3max):

$$FC=F_{Ms}(\theta, L1min, L1max, L2min, L2max, L3min, L3max).$$

Then, the processing proceeds to Step 607.

At Step 607, the focus control calculating part 121 calculates an operation angle $\theta_m$ of the focus operating knob which causes the focus control signal to be $FC_{m-1}$ in the object distance clustering range presence mode. Then, the focus control calculating part 121 sets the calculation result to a reference operation angle (default operation angle) of the focus operating knob at which $FC_{m-1}$ is output after switching of the curve mode to the object distance clustering range presence mode. Thereafter, the processing proceeds to Step 609.

The reference operation angle $\theta_m$ is calculated from $\theta_m=F_{Ms}^{-1}(FC_{m-1}, L1min, L1max, L2min, L2max, L3min, L3max)$ that is an inverse function of $FC=F_{Ms}(\theta, L1min, L1max, L2min, L2max, L3min, L3max)$ expressing the focus curve in the object distance clustering range presence mode.

Moreover, at Step 611, the automatic curve mode setting processing part 118 determines whether or not the determination result received from the lens apparatus 100 is "object distance clustering range is present". The processing proceeds to Step 612 if the determination result is "object distance clustering range is present", and proceeds to Step 613 if the determination result is "Standard".

At Step 612, the focus control calculating part 121 calculates the focus control signal $FC_m$ as follows:

$$FC_m=F_{Ms}(\theta_m, L1min, L1max, L2min, L2max, L3min, L3max).$$

Then, the processing proceeds to Step 614.

Figure 16:
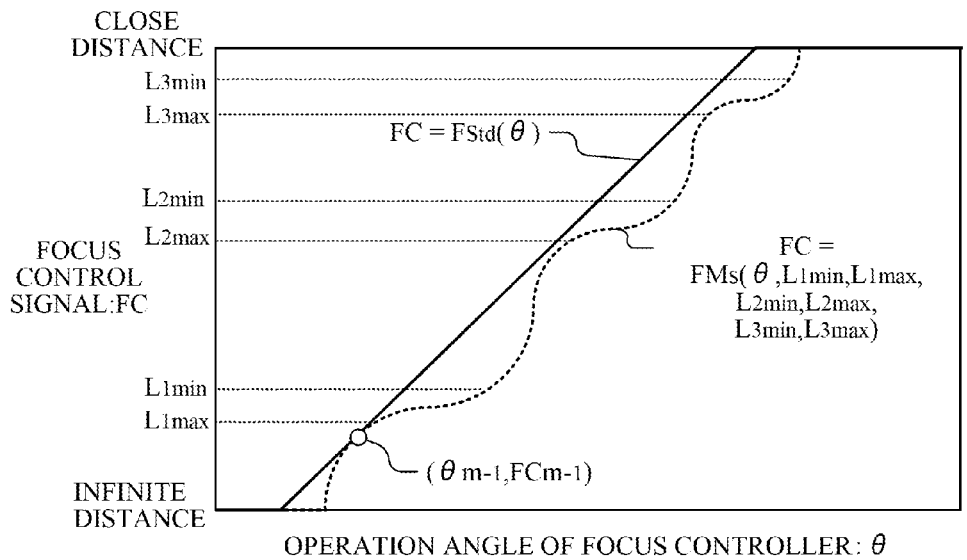
FIG. 16 shows focus operation sensitivity being set in Embodiment 4.

FIG. 16 shows the focus curves each of which is data for deciding the relationship of the focus control signal FC (that is, the position of the focus lens 101) to the operation angle of the focus controller (focus operating knob) 117 in each of the object distance clustering range presence mode and the Standard mode. A horizontal axis in FIG. 16 represents the operation angle $\theta$ of the focus controller 117, and a vertical axis represents the focus control signal FC. The focus curves for the object distance clustering range presence mode and the Standard mode are respectively shown by $FC=F_{Ms}(\theta, L1min, L1max, L2min, L2max, L3min, L3max)$ and $FC=F_{std}(\theta)$.

The focus curve for the Standard mode is set such that the focus control signal FC is linearly changed with respect to the operation angle $\theta$ of the focus controller 117 from the close distance end to the infinite distance end to the operation.

The focus curve for the object distance clustering range presence mode is set such that a change amount of the focus control signal FC with respect to a change amount of the operation angle $\theta$ of the focus controller 117 increases as the position of the focus lens 101 becomes closer to positions corresponding to the minimum and maximum object distances (positions closer to the close distance end and the infinite distance end) in each object distance clustering range, and decreases in a middle object distance between the minimum and maximum object distances in each object distance clustering range.

Thus, in the object distance clustering range presence mode, a characteristic of the focus position control is set such that the focus operation sensitivity for the first distance range where many of the object distances are distributed is lower than that for the second distance range (non-object distance clustering range) different from the first distance range. This makes it possible that a small operation amount of the focus controller 117 causes the focus lens 101 to move widely from a movable area corresponding to the second distance range to that corresponding to the first distance range. Further, it makes it possible that the focus lens 101 is moved in minute steps to perform fine focus adjustment in the first distance range.

An intersection ($\theta_{m-1}$, $FC_{m-1}$) of the two focus curves in FIG. 16 shows a point where the processing of FIG. 15 proceeds from Step 603 to Step 604 according to the determination at Step 603 that the current curve mode is different from the curve mode corresponding to the determination result received from the lens apparatus 100. Switching the curve mode at this point does not change the focus control signal before and after the switching of the curve mode, thereby making it possible to prevent a sudden movement of the focus lens 101.

Thus, this embodiment also can automatically set appropriate focus operation sensitivity corresponding to the distance range where the object distances are distributed (clustered).

The above embodiment has described the case where three object distance clustering ranges are present. However, this is merely an example, and the number of the object distance clustering ranges is not limited thereto.

Moreover, the ranging areas for the determination of the object distance clustering range may be limited to ranging areas included in an AF area as in Embodiment 3.

Embodiment 5

Next, description will be made of a fifth embodiment (Embodiment 5) of the present invention. A configuration of an image pickup system of this embodiment is the same as that of Embodiment 1 shown in FIG. 1A. This embodiment limits an effective operation angle of the focus controller 117 in a curve mode (for example, the Center mode) other than the Standard mode according to a maximum object distance and a minimum object distance of the calculated (detected) object distances.

Figure 17:
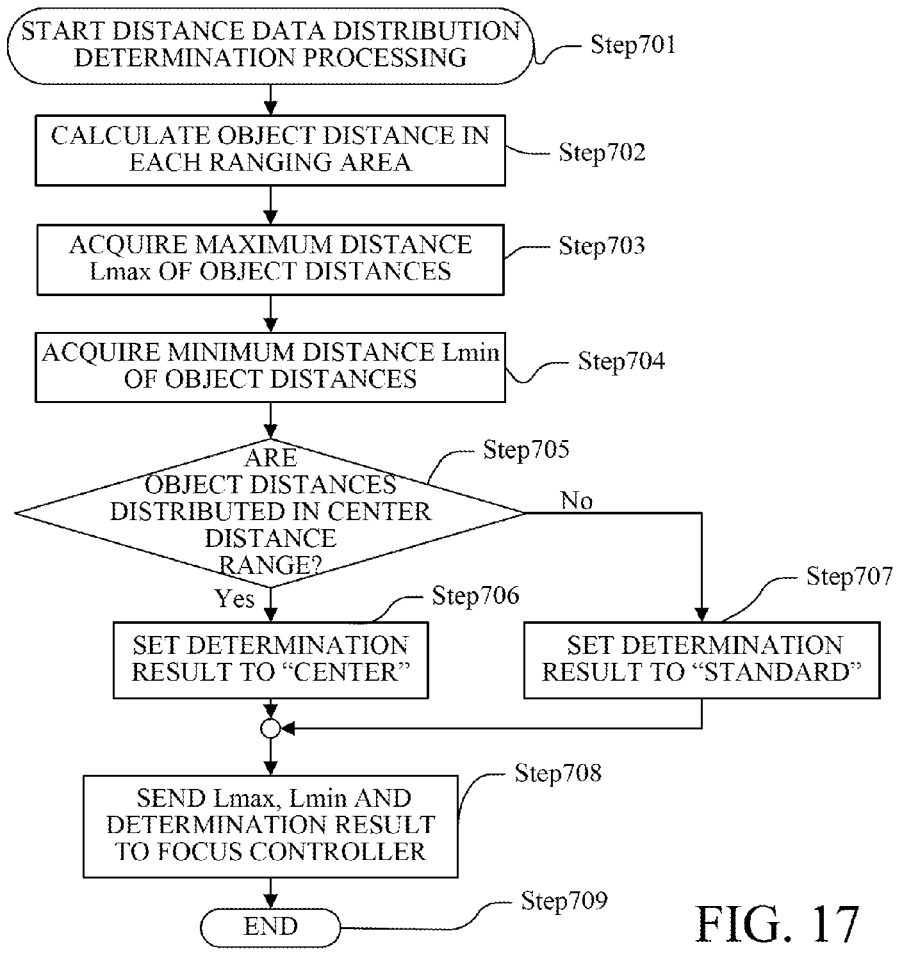
FIG. 17 is a flowchart showing processing in a drive controlling unit in Embodiment 5 of the present invention.

A flowchart of FIG. 17 shows distance data distribution determination processing performed by the drive controlling unit 114 (that is, by the distance calculating part 115 and the distance data distribution determining part 116) in this embodiment. Processes at Steps 701, 702, Steps 705 to 707 and Step 709 are the same as those at Steps 201 to 205 and Step 207 in Embodiment 2 (FIG. 6), respectively.

At Step 703, the distance data distribution determining part 116 acquires the maximum object distance Lmax of the plural object distances calculated at Step 702. Then, the processing proceeds to Step 704.

At Step 704, the distance data distribution determining part 116 acquires the minimum object distance Lmin of the plural object distances calculated at Step 702. Then, the processing proceeds to Step 705.

At Step 708, the distance data distribution determining part 116 sends to the focus controller 117 the acquired maximum and minimum object distances Lmax and Lmin and the determination result of the distance range where the object distances are distributed. Then, the processing proceeds to Step 709.

In this embodiment, if the distribution of the object distances calculated in the respective ranging areas at Step 702 is the same as that in Embodiment 2 (FIG. 7), the distance data distribution determining part 116 acquires the maximum object distance Lmax (=11 m) at Step 703 and the minimum object distance Lmin (=7 m) at Step 704. Then, at Step 706, the distance data distribution determining part 116 sets its determination result to "Center".

On the other hand, if the distribution of the calculated object distances are evenly distributed over the entire distance range, the distance data distribution determining part 116 acquires the maximum object distance Lmax (=19 m) at Step 703 and the minimum object distance Lmin (=3 m) at Step 704. Then, at Step 707, the distance data distribution determining part 116 sets the determination result to "Standard".

Figure 18:
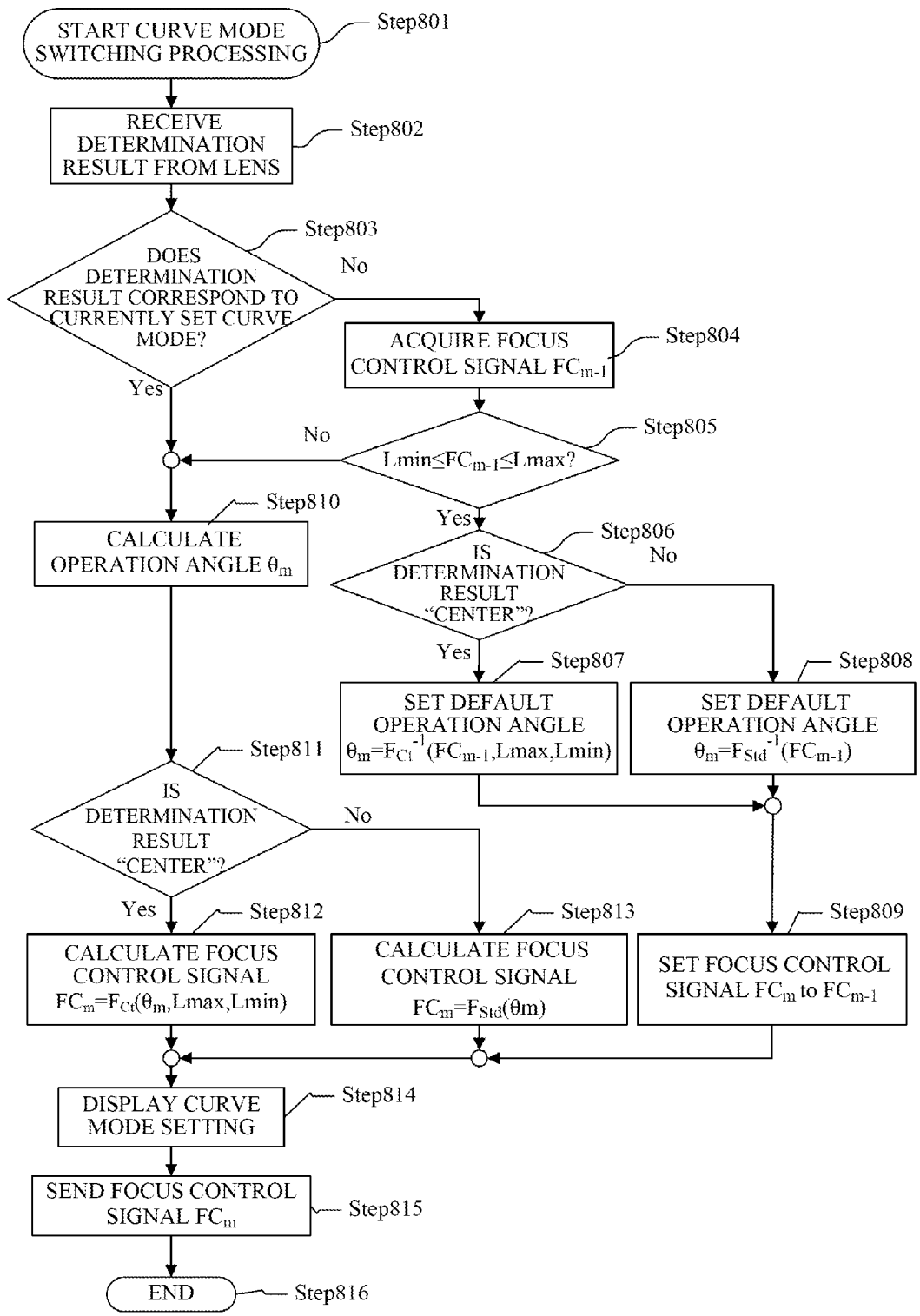
FIG. 18 is a flowchart showing processing performed in a focus controller in Embodiment 5.

A flowchart of FIG. 18 shows curve mode switching processing performed by the focus controller 117 (that is, by the automatic curve mode setting processing part 118, the operation angle detecting part 120, the focus control calculating part 121 and the curve mode setting state displaying part 119). Processes at Steps 801 to 804, Step 806, Steps 808 to 811 and Steps 813 to 816 in FIG. 18 are the same as those at Steps 301 to 304, Step 305, Steps 307 to 310 and Steps 312 to 315 in Embodiment 2 (FIG. 8).

At Step 805, the automatic curve mode setting processing part 118 determines whether or not the following relationship (condition) is established (satisfied):

$$L\min \leq FC_{m-1} \leq L\max.$$

The processing proceeds to Step 806 if the above relationship is established, and proceeds to Step 810 if the relationship is not established.

At Step 806, the automatic curve mode setting processing part 118 determines whether or not the determination result received from the lens apparatus 100 is "Center". The processing proceeds to Step 807 if the determination result is "Center", and proceeds to Step 808 if the determination result is not "Center".

At Step 807, the focus control calculating part 121 calculates an operation angle $\theta_m$ of the focus operating knob which causes the focus control signal FC to be $FC_{m-1}$ in the Center mode. Then, the focus control calculating part 121 sets the calculation result to a reference operation angle (default operation angle) of the focus operating knob at which $FC_{m-1}$ is output after switching of the curve mode to the Center mode. Thereafter, the processing proceeds to Step 809.

The reference operation angle $\theta_m$ is calculated from $\theta_m = F_{Ct}^{-1}(FC_{m-1}, L\max, L\min)$ that is an inverse function of $FC = F_{Ct}(\theta, L\max, L\min)$ expressing the relationship between the operation angle θ of the focus operating knob and the focus control signal FC in the Center mode.

At Step 812, the focus control calculating part 121 calculates the focus control signal $FC_m = F_{Ct}(\theta_m, L\max, L\min)$. Then, the processing proceeds to Step 814.

Figure 19:
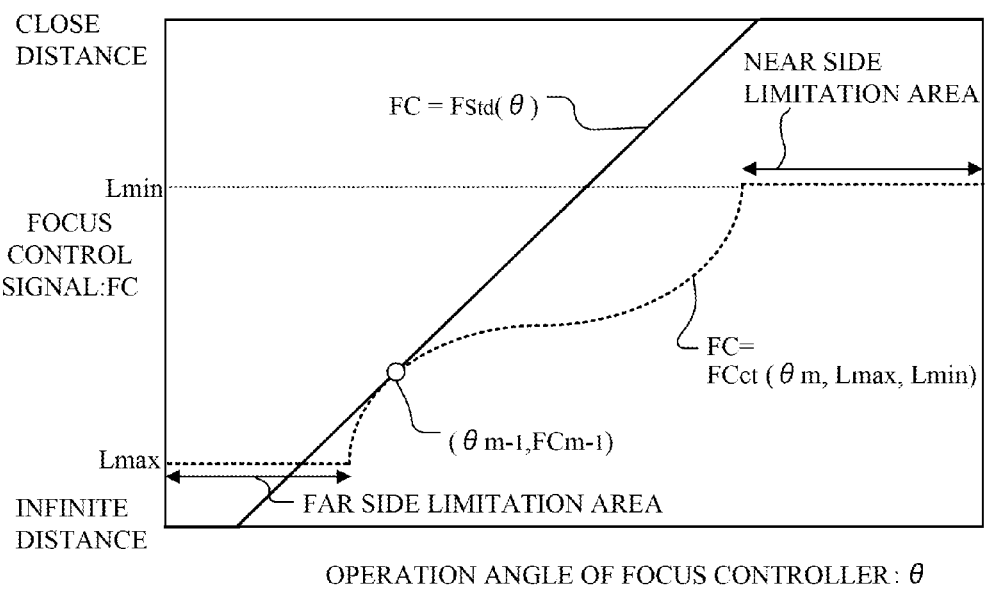
FIG. 19 shows focus operation sensitivity being set in Embodiment 5.

FIG. 19 shows focus curves each of which is data for deciding an output characteristic of the focus control signal FC (that is, a position control characteristic of the focus lens 101) to the operation angle of the focus controller (focus operating knob) 117 in each of the Center and Standard modes. A horizontal axis in FIG. 19 represents the operation angle θ of the focus controller 117, and a vertical axis represents the focus control signal FC. The focus curves for the Center and Standard modes are respectively shown by $FC = F_{Ct}(\theta, L\max, L\min)$ and $FC = F_{std}(\theta)$.

In the Center mode, the focus curve shown by $FC = F_{Ct}(\theta)$ is limited within a range between Lmax and Lmin. The limitation makes it possible to prevent capturing of a significantly blurred image caused due to movement of the focus lens 101 beyond the positions corresponding to Lmax and Lmin toward the infinite distance end and the close distance end.

Also in this embodiment, an intersection $(\theta_{m-1}, FC_{m-1})$ of the two focus curves in FIG. 19 shows a point where the processing of FIG. 18 proceeds from Step 803 to Step 804 according to the determination at Step 803 that the current curve mode is different from the curve mode corresponding to the determination result received from the lens apparatus 100. Switching the curve mode at this point does not change the focus control signal before and after the switching of the curve mode, thereby making it possible to prevent a sudden movement of the focus lens 101.

Thus, this embodiment also can automatically set appropriate focus operation sensitivity corresponding to the distance range where the object distances are distributed. Further, this embodiment can prevent capturing of a significantly blurred image.

This embodiment has described the case where the curve mode is switched between the Center mode and the Standard mode. However, the curve mode may be switched among Far, Near and Standard modes as in Embodiment 1.

According to the above-described embodiments, the focus operation sensitivity is automatically switched according to the distribution of the object distances. This makes it possible to obtain focus operation sensitivity appropriate for the distribution of the object distances while eliminating a need of a user's operation for switching the focus operation sensitivity, which can achieve an image pickup system with good operability.

Each of the above embodiments has described the case where the focus control characteristic is set such that the focus operation sensitivity for the distance range where many object distances are distributed is lower than those to the other distance range(s). However, such a focus control characteristic and another focus control characteristic in which the focus operation sensitivity for the distance range where many object distances are distributed is higher than that to another distance range(s) may be selected. This enables setting of a focus control characteristic according to user's preference or an image capturing condition.

Moreover, an image pickup system of an alternative embodiment of the present invention may have a object recognizing part which is not shown and performs recognition of an object present in the image pickup frame by a face recognition method, a pattern matching method or the like, and may change a relationship between the operation amount of the focus operating member and the movement amount (position or position changing amount) of the focus lens such that an in-focus operation for the distance of that object can be easily performed.

Specifically, the object recognizing part specifies an area where the object exists in the image pickup frame to acquire a measured object distance in the object existing area. Next, the automatic curve mode setting processing part 118 selects (generates) a curve mode for the measured object distance such that the movement amount (position changing amount) of the focus lens to the operation amount of the focus operating member is smaller than those at other object distances. Such a configuration enables fine focus adjustment (delicate in-focus operation) in the distance range where the object exists and enables quick focusing (quick movement of an in-focus point) in the distance range where the object does not exist, thereby making image capturing smooth. The object recognition may be performed by the phase difference sensor (ranging sensor or AF detector) 112, the distance data distribution determining part (determining part) 116, the image pickup element 201 provided to the image pickup apparatus 200 or the image processing circuit 202 which processes the output signal from the image pickup element 201, and may be performed by an object recognizing part other than them.

Moreover, each of the above embodiments has described the case where the focus operation sensitivity (curve mode) is switched according to the distribution determination result of the object distances. However, the focus operation sensitivity may be switched, not during the movement of the focus lens or the zoom lens, but after the movement thereof is ended. This can eliminate unnecessary switching of the focus operation sensitivity.

Furthermore, the distance data distribution determination processing and the curve mode switching processing described above may be repeated at a predetermined interval, or may be performed at a user's arbitrary interval or timing. This makes it possible to provide switching responsivity appropriate for user's preference or an image capturing condition, which enables improvement of the operability of the image pickup system.

Moreover, although each of the above embodiments has described the case where the distance calculating part 115 and the distance data distribution determining part 116 are provided in the lens apparatus 100, these may be provided in the focus controller 117. Further, although each of the above embodiments has described the case where the automatic curve mode setting processing part 118 and the curve mode setting state displaying part 119 are provided in the focus controller 117, these may be provided in the lens apparatus 100.

As described above, the image pickup system of each of Embodiments 1 to 5 automatically changes the relationship between the operation amount of the focus operating member and the position of the focus lens according to the determination result of the distance range where the object distances are distributed and the result of the object recognition. This enables provision of the focus operation sensitivity appropriate for the distribution of the object distances while eliminating the need of a user's operation for changing the focus operation sensitivity.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims the benefit of Japanese Patent Application No. 2009-185460, filed on Aug. 10, 2009, which is hereby incorporated by reference herein in its entirety.

What is claimed is:

1. An image pickup system comprising:
   a lens apparatus including a focus lens;
   an image pickup apparatus configured to perform image pickup through the lens apparatus;
   an operating part configured to be operated to instruct a movement of the focus lens;
   a controlling part configured to perform focus position control to move the focus lens to a position corresponding to an operation amount of the operating part;
   a ranging part configured to detect an object distance in each of plural ranging areas included in an image pickup region;
   a determining part configured to determine a distance range where the object distances detected in the plural ranging areas are distributed; and
   a changing part configured to change a relationship between the operation amount of the operating part and the position of the focus lens in the focus position control according to a determination result by the determining part,
   wherein, when defining the distance range where the detected object distances are distributed as a first distance range, and defining a distance range different from the first distance range as a second distance range, the changing part is configured to change the relationship between the operation amount of the operating part and the position of the focus lens such that a change amount of the position of the focus lens with respect to a change amount of the operation amount of the operating part in a first focus lens movable range corresponding to the first distance range is smaller than that in a second focus lens movable range corresponding to the second distance range.

2. An image pickup system according to claim 1, wherein the determining part is configured to determine as the distance range an object distance clustering range in which at least part of the detected object distances is clustered.

3. An image pickup system according to claim 2, wherein the changing part is configured to change the relationship between the operation amount of the operating part and the position of the focus lens such that a change amount of the position of the focus lens with respect to a change amount of the operation amount of the operating part in the object distance clustering range is smaller than that in an object distance non-clustering range other than the object distance clustering range.

4. An image pickup system according to claim 1, wherein the determining part is configured to weight the respective detected object distances and determine the distance range based on the weighted object distances.

5. An image pickup system according to claim 1, further comprising:
a focus detection area setting part configured to set in the image pickup region a focus detection area where a focus state of the lens apparatus is detected,
wherein the determining part is configured to determine the distance range where the object distances are distributed detected in the plural ranging areas included in the focus detection area.

6. A lens apparatus for an image pickup system including an image pickup apparatus performing image pickup through the lens apparatus, the lens apparatus comprising:
a focus lens; and
a ranging part configured to detect an object distance in each of plural ranging areas included in an image pickup region,
wherein the image pickup system comprises:
an operating part configured to be operated to instruct a movement of the focus lens;
a controlling part configured to perform focus position control to move the focus lens to a position corresponding to an operation amount of the operating part;
a determining part configured to determine a distance range where the object distances detected in the plural ranging areas are distributed; and
a changing part configured to change a relationship between the operation amount of the operating part and the position of the focus lens in the focus position control according to a determination result by the determining part,
wherein, when defining the distance range where the detected object distances are distributed as a first distance range, and defining a distance range different from the first distance range as a second distance range, the changing part is configured to change the relationship between the operation amount of the operating part and the position of the focus lens such that a change amount of the position of the focus lens with respect to a change amount of the operation amount of the operating part in a first focus lens movable range corresponding to the first distance range is smaller than that in a second focus lens movable range corresponding to the second distance range.

* * * * *